United States Patent [19]
Nagao et al.

[11] Patent Number: 6,026,925
[45] Date of Patent: Feb. 22, 2000

[54] ELECTRICALLY DRIVEN POWER ASSISTING DEVICE

[75] Inventors: Yasuhiro Nagao, Okazaki; Tsutomu Shiga, Nukata-gun; Nobuhiko Uryu, Kariya; Yuuji Hashiba, Nagoya; Toshitaka Tanahashi, Okazaki, all of Japan

[73] Assignee: Denso Corporation, Kariya, Japan

[21] Appl. No.: 09/064,172

[22] Filed: Apr. 22, 1998

Related U.S. Application Data

[63] Continuation-in-part of application No. 08/768,928, Dec. 18, 1996, Pat. No. 5,927,428.

[30] Foreign Application Priority Data

| Dec. 19, 1995 | [JP] | Japan | 7-330259 |
| Oct. 22, 1996 | [JP] | Japan | 8-279561 |
| Jun. 19, 1997 | [JP] | Japan | 9-162228 |
| Aug. 28, 1997 | [JP] | Japan | 9-231983 |

[51] Int. Cl.[7] .................................................. B62D 5/04

[52] U.S. Cl. ................................................... 180/444

[58] Field of Search .................................. 180/443, 444, 180/445, 446; 475/294; 74/355

[56] References Cited

U.S. PATENT DOCUMENTS

| 4,416,345 | 11/1983 | Barthelemy | 180/444 |
| 5,711,396 | 1/1998 | Joerg et al. | 180/444 |
| 5,732,791 | 3/1998 | Pinkos et al. | 180/444 |

FOREIGN PATENT DOCUMENTS

| 0051515 | 12/1982 | European Pat. Off. |
| 3721042 | 1/1988 | Germany . |
| 60-20746 | 2/1985 | Japan . |
| 62-273165 | 11/1987 | Japan . |
| 3-7661 | 1/1991 | Japan . |
| 6-2932266 | 10/1994 | Japan . |
| 6-316270 | 11/1994 | Japan . |
| 7-61362 | 3/1995 | Japan . |

*Primary Examiner*—Kevin Hurley
*Attorney, Agent, or Firm*—Pillsbury Madison & Sutro LLP

[57] ABSTRACT

In a vehicle power steering device, a motor is turned on to rotate in one direction whether a steering wheel is turned clockwise or counterclockwise. A switching mechanism is interposed between a motor armature shaft and an output shaft to change directions of the output shaft rotation relative to the armature shaft rotation in response to turning direction of the steering. The switching mechanism may include electrically controlled coupling/releasing members or mechanically controlled rotation reversing and coupling mechanisms.

24 Claims, 16 Drawing Sheets

ELECTRICALLY DRIVEN POWER ASSISTING DEVICE

CROSS REFERENCE TO RELATED APPLICATION

This is a continuation-in-part application of U.S. patent application Ser. No. 08/768,928 filed on Dec. 18, 1996 now U.S. Pat. No. 5,927,428 and incorporates herein by reference Japanese patent applications No. 7-330259 filed on Dec. 19, 1995, No. 8-279561 filed on Oct. 22, 1996, No. 9-162228 filed on Jun. 19, 1997 and No. 9-231983 filed on Aug. 28, 1997.

BACKGROUND OF THE INVENTION

1. Field of the Invention

The present invention relates to an electrically driven power assisting device such as a power steering device for a vehicle.

2. Description of Related Art

Recently, as a power steering for a vehicle, an electrically driven power steering device using an electric motor in place of a hydraulic motor is used and as the torque of a motor in the same rotational direction as the following one is required to be transmitted according to the clockwise or counterclockwise rotation of the steering of a vehicle, the prior art in which the armature of a motor is rotated according to the clockwise or counterclockwise rotation of a steering is disclosed in Japanese unexamined patent application publication No. H6-316270.

However, this device has a problem that the flow of electric current to the motor is required to be switched so as to rotate the motor in the same direction as the clockwise or counterclockwise rotation of a steering wheel, measures to suppress armature reaction and spark noise generation are required because excessive current flows when the flow of current is switched, further a plurality of diodes and transistors for switching the flow direction of current are required.

In Japanese unexamined patent application publication No. H7-61362, a movable body is straight spline-coupled to either one of a stub shaft or a pinion shaft and is helical spline-coupled to the other shaft. A first or second clutch mechanism is operated by the movable body moved by the rotation of the stub shaft. The unidirectional rotation of a motor is reversed by a driving bevel gear and a pair of driven bevel gears and transmitted to the pinion shaft.

This device has a problem that the life and the precision of a torsion bar are deteriorated because torque for moving the movable body via the helical spline coupling by twisting the torsion bar provided between the stub shaft and the pinion shaft through the rotation of the motor is not required to be reversed and transmitting the rotation of the motor is directly applied to the torsion bar via the helical spline coupling.

In Japanese unexamined patent publication No. 6-293266, since a movable member is moved by the steering force of a driver to couple a clutch mechanism, in consideration of that the clutch mechanism is expected to be smoothly switched to switch the direction of the steering assistance force without giving unpleasant feeling to the driver when the rotation of a steering wheel is suddenly switched to the right or to the left, for example, if the clutch mechanism is an engagement type clutch such as a ratchet type clutch, the vibration caused when the clutch mechanism is coupled or released is directly transmitted to the steering wheel, which is not desirable. In the meantime, since the power steering device is given the steering assistance force by an electric motor such that steering can be performed by the steering force of about 5 Nm, the extent of movement of the movable member which is produced by the steering force of the driver can not be set too large. Therefore, since the pressing force for engaging the clutch plate can not be increased only by the steering force of the driver, it is necessary to use material having a large coefficient of friction or to increase the contact area by enlarging the outer diameter of the clutch plate so as to obtain the required pressing force. However, it is natural that the material having the large coefficient of friction is disadvantageous in the wear of the friction contact area and in durability. Moreover, if the outer diameter of the clutch plate is enlarged so as to increase the contact area, it is natural that the enlarged device is enlarged, which results in a problem.

In Japanese unexamined patent publication No. 62-273165, an electromagnetic clutch which is operated based on the steering torque of a driver can be used and hence the magnetic force generated by the exciting coil of the electromagnetic clutch can produce the pressing force of the clutch plate (engaging force). Therefore, the clutch corresponding to the output of the electric motor can be supplied by increasing a current supplied to the exciting coil or the number of turns of the exciting coil. However, if it is required that the engaging force of the clutch is completely supplied only by the attracting force of the electromagnetic clutch, the size of the electromagnetic clutch becomes large.

SUMMARY OF THE INVENTION

It is therefore an object of the present invention to provide an improved electrically driven power assisting device, wherein input shaft rotation is powered and transmitted to output shaft rotation by an electric motor without switching the flow direction of the current of the motor.

According to one aspect of the present invention, an armature shaft of an electric motor is disposed on a different axis relative to a steering shaft and the rotation of the electric motor is transmitted to a planetary gear speed reduction mechanism provided on the same axis as the steering shaft via a transmitting member and the rotation reduced by the planetary gear speed reduction mechanism is transmitted to an output-side shaft in the steering shaft. The rotational direction of a rotational force transmitted to the output-side shaft by the planetary gear speed reduction mechanism can be switched by a switching mechanism according to the rotational direction of an input-side shaft in the steering shaft. Thus, the armature shaft of the electric motor can be disposed on the different axis relative to the steering shaft and the planetary gear speed reduction mechanism can be disposed on the same axis as the steering shaft by interposing a transmitting member between the electric motor and the planetary gear speed reduction mechanism.

According to another aspect of the present invention, a switching unit is provided for switching a unidirectional rotation output by an electric motor to the rotation in normal and reverse directions according to the rotational direction of a stub shaft. The switching unit is provided with a first rotating member and a second rotating member to which the rotation of the motor is transmitted and which are rotated in the opposite directions each other. A selecting mechanism is provided for selecting either the first rotating member or the second rotating member. A clutch mechanism is provided for coupling one selected rotating member to an output shaft. A changing mechanism is provided for generating a load in the direction of the thrust of the output of the electric motor and for changing the thrust load to the engaging force of the clutch mechanism. Thus, since the engaging force of the clutch mechanism can be obtained by the thrust load generated by the output of the electric motor, it is essential only that the steering force of the driver is a start for switching the rotational direction of the electric motor for the switching mechanism.

BRIEF DESCRIPTION OF THE DRAWINGS

Other objects, features and advantages of the present invention will be made more apparent from the following detailed description in conjunction with the accompanying drawings, in which.

Figure 1:
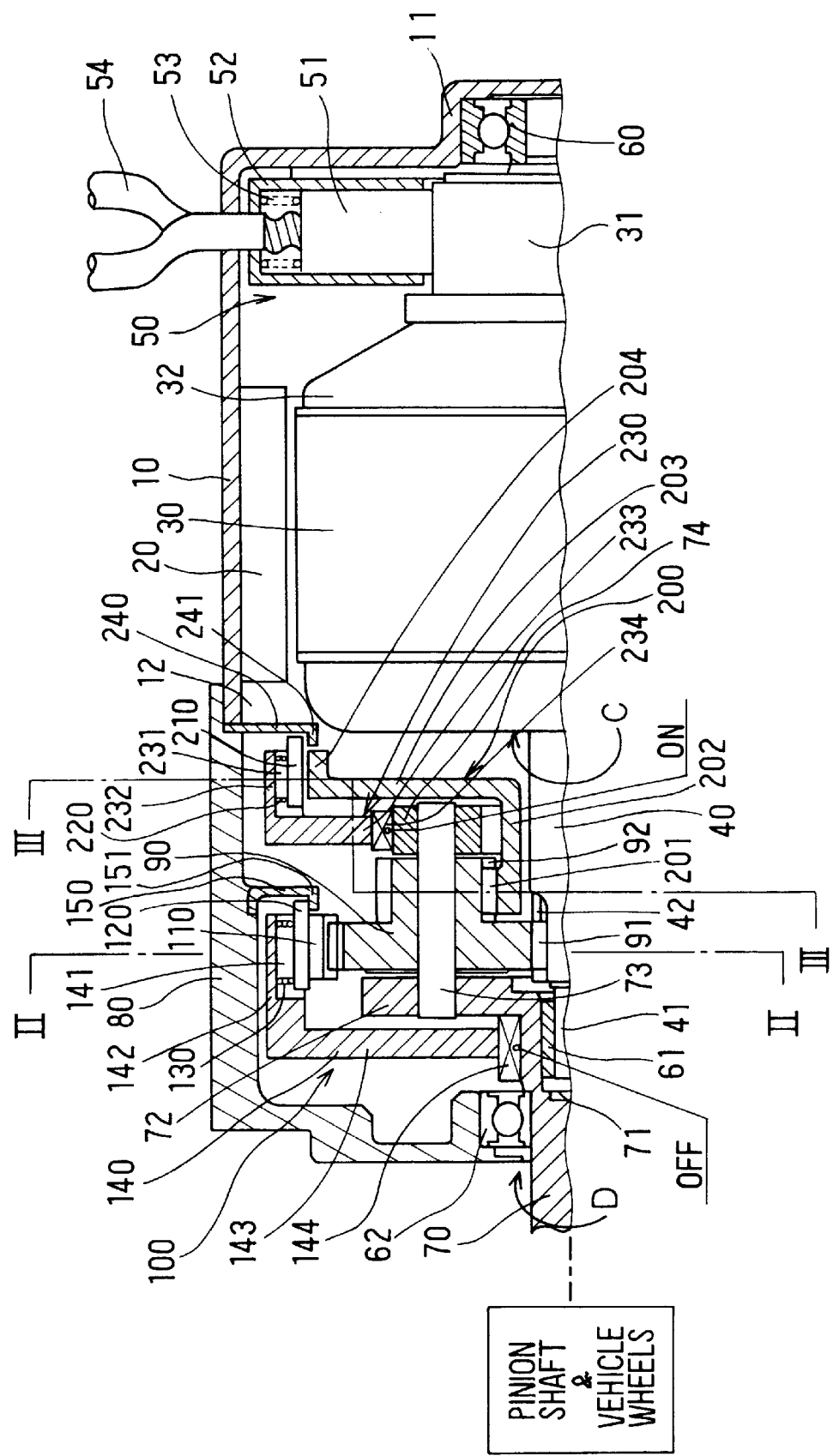
FIG. 1 is a sectional view showing a motor according to a first embodiment of the present invention.

DETAILED DESCRIPTION OF PRESENTLY PREFERRED EMBODIMENTS (First Embodiment)

A first embodiment of the present invention in which a motor is applied to an electrically driven power assisting device such as a power steering device will be described in detail below referring to FIGS. 1 to 6.

A motor comprises a cylindrical yoke 10, a plurality of magnets 20 forming a stator fixed on the inner face of this yoke 10, an armature 30 provided inside these magnets 20, provided with a commutator 31 at one axial end and on which an armature coil is wound, an armature shaft 40 for rotatably supporting this armature 30 and a brush mechanism 50 for supplying current to the commutator 31 of the armature 30. This brush mechanism 50 is constituted by a brush 51 which is in contact with the commutator 31, a brush holder 52 for holding this brush 51, a brush spring 53 for radially inwardly pressing the brush 51 on the side of the commutator 31 and a power supply line 54 for supplying electric current to the brush 51.

One axial end of the armature shaft 40 is supported by a bearing 60 housed in a bearing holder 11 provided on the side of the yoke 10 so that the armature shaft 40 can be rotated and a portion 41 with a smaller diameter than that of the armature shaft 40 is formed at the other end of the armature shaft 40.

An output shaft 70 is coupled with a steering shaft not shown so that the torque of this output shaft 70 assists that of a steering wheel through a pinion shaft in the known manner, such as described in, for example Japanese unexamined patent application publication No. H3-7661. This output shaft 70 is arranged on the same axis as the armature shaft 40 and the smaller diameter portion 41 of the armature shaft 40 is housed in a concave portion 71 formed at one axial end of this output shaft 70 via a bearing 61 so as to support the other end of the armature shaft 40 so that the armature shaft can be rotated. A disc part 72 extended in the direction of the diameter of the output shaft is formed at one end of the output shaft 70.

A housing 80 covers the open end 12 of the yoke 10 and supports the output shaft 70 by a bearing 62 so that the output shaft 70 can be rotated.

Planetary gears 90 are held along the periphery of a plurality of pins 73 (planetary shafts) fixed on the periphery of the disc part 72 of the output shaft 70 at an equal angular interval so that each planetary gear 90 can be rotated therearound, and a first gear 91 (a first planetary gear) formed in a part with a large diameter and a second gear 92 (a second planetary gear) formed in a part with a small diameter are formed. The first gear 91 of the planetary gear 90 is engaged with a sun gear 42 (a first sun gear) formed on the periphery of the armature shaft 40.

An internal gear mechanism 100 is constituted by a circular internal gear 110 the inner face of which is engaged with the first gear 91 of the planetary gear 90, a first cylindrical contact member 120 which is in contact with the periphery of this internal gear 110, a first spring 130 for pressing this contact member 120 radially inwardly on the periphery of the internal gear 110 and a first bracket 140.

A first bracket 140 is constituted by a cylindrical part 142 provided with a housing 141 for housing a first spring 130 and a disc part 143 extended from one end of this cylindrical part 142 to the output shaft 70 and a first electrically-controlled ON/OFF type coupling/releasing member 144 for coupling or releasing the end face of the disc part 143 to/from the output shaft 70 is provided between the end face of this disc part 143 and the output shaft 70. A first supporting member 150 is fixed on the inner face of the housing 80 and a bent part 151 which is in contact with one end of the contact member 120 is formed at the end thereof.

A rotation supporter 200 is constituted by an cylindrical part 202 on the periphery of which a gear 201 (a second sun gear) engaged with the second gear 92 of the planetary gear 90 is formed and which is extended along the armature shaft 40, a disc part 203 extended from one end of this cylindrical part 202 to the direction of the diameter of the cylindrical part and a flange part 204 extended from the periphery of this disc part 203 to the side of the armature 30.

Further, a second cylindrical contact member 210 which is in contact with the periphery of the flange part 204 of the rotation supporter 200, a second spring 220 for pressing this second contact member 210 on the periphery of the flange part 204 of the rotation supporter 200 and a second bracket 230 are provided. A circular portion 74 is provided at one end of the plurality of pins 73 fixed on the periphery of the disc part 72 of the output shaft 70 at an equal angular interval.

This second bracket 230 is constituted by a cylindrical part 232 provided with a housing 231 for housing the second spring 220 and a disc part 233 extended from one end of this cylindrical part 232 to the circular portion 74 and a second electrically controlled ON/OFF type coupling/releasing member 234 for coupling or releasing the end face of this disc part 233 to/from the pin 73 is provided between the end face of this disc part 233 and the circular portion 74. A supporting member 240 is fixed between the housing 80 and the yoke 10 and a bent part 241 which is in contact with one end of the second contact member 210 is formed at the end thereof.

Next, operation of this motor will be described referring to FIGS. 1 to 3 with respect to a case that the direction of rotation of the armature shaft 40 and that of the output shaft 70 are the same.

First, when the output shaft 70 is rotated by steering in the direction shown by an arrow D in FIG. 1, the end face of the disc part 143 of the first bracket 140 and the output shaft 70 are released by turning OFF the first coupling/releasing member 144 so that the rotation of the output shaft 70 is not transmitted to the first bracket 140.

Figure 2:
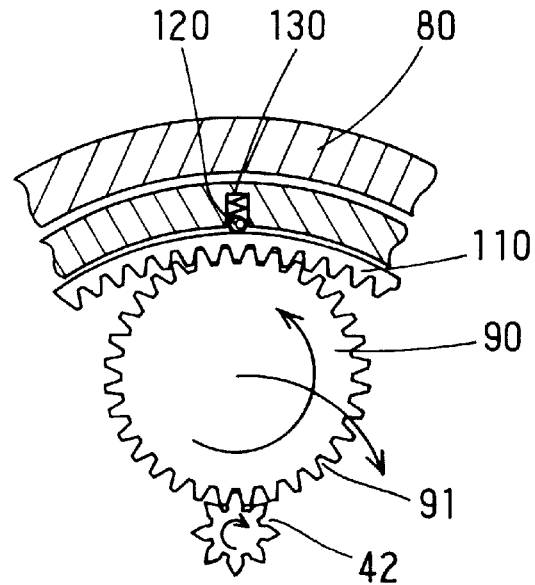
FIG. 2 is a sectional view showing a part of the motor viewed along a line II—II in FIG. 1.

As shown in FIG. 2, one end of the first contact member 120 is pressed on the bent part 151 of the first supporting member 150 with the first contact member 120 pressed on the periphery of the internal gear 110 by the first spring 130 (see FIG. 1). Thus, the rotation of the internal gear 110 is regulated relative to the housing 80.

Further, as the end face of the disc part 233 of the second bracket 230 and the circular portion 74 are coupled by the second coupling/releasing member 234, the second bracket 230 is supported by the periphery of the circular portion 74. Thus, as shown in FIG. 3, as the second contact member 210 is housed in the housing 231 of the cylindrical part 232 of the second bracket 230 by the effect of centrifugal force against the second spring 220, clearance is provided between the second contact member 210 and the flange part 204 of the rotation supporter 200. As the end face of the disc part 233 of the second bracket 230 and the pin 73 are coupled by turning ON the second coupling/releasing member 234 at this time, the second bracket 230 is supported by the periphery of the pin 73.

When the armature 30 is rotated in the direction shown by an arrow C in FIG. 1 in this state, this rotation is transmitted to the first gear 91 of the planetary gear 90 via the armature shaft 40 and the sun gear 42. As the rotation of the rotation supporter 200 is not regulated relative to the housing 80 and the rotation of the internal gear 110 is regulated relative to the housing 80 because the clearance is provided between the second contact member 210 and the flange part 204 of the rotation supporter 200, the planetary gear 90 is rotated on its own axis along the periphery of the pin 73, the armature shaft 40 is rotated clockwise as shown in FIG. 2, as a result the rotational speed of the armature shaft 40 is reduced and the output shaft 70 can be rotated in the same direction as the armature shaft 40 as shown by an arrow D. Thus, vehicle steering is assisted by the rotation of the output shaft 70.

Next, reverse operation of motor will be described referring to FIGS. 4 to 6 with respect to a case that the rotational direction of the armature shaft 40 and the output shaft 70 is reverse.

Figure 3:
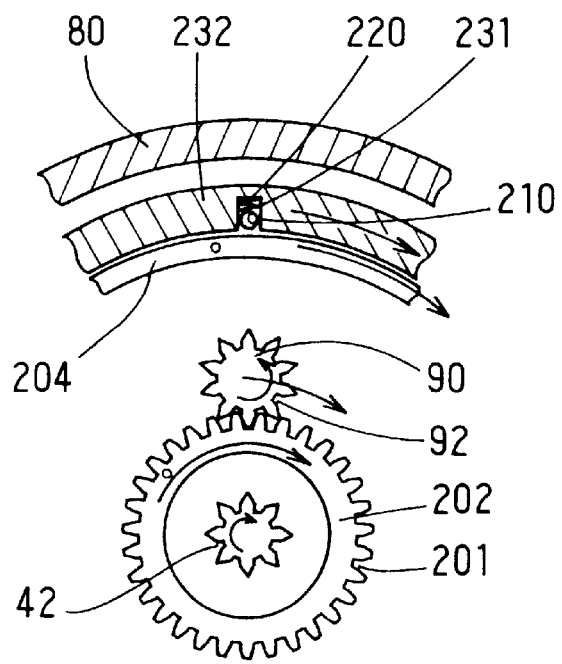
FIG. 3 is a sectional view showing a part of the motor viewed along a line III—III in FIG. 1.

First, the disc part 143 of the first bracket 140 and the output shaft 70 are coupled by turning ON the first coupling/releasing member 144 when the output shaft 70 is rotated by steering in the direction shown by an arrow D' in FIG. 3, and the first bracket 140 is supported by the output shaft 70.

Figure 4:
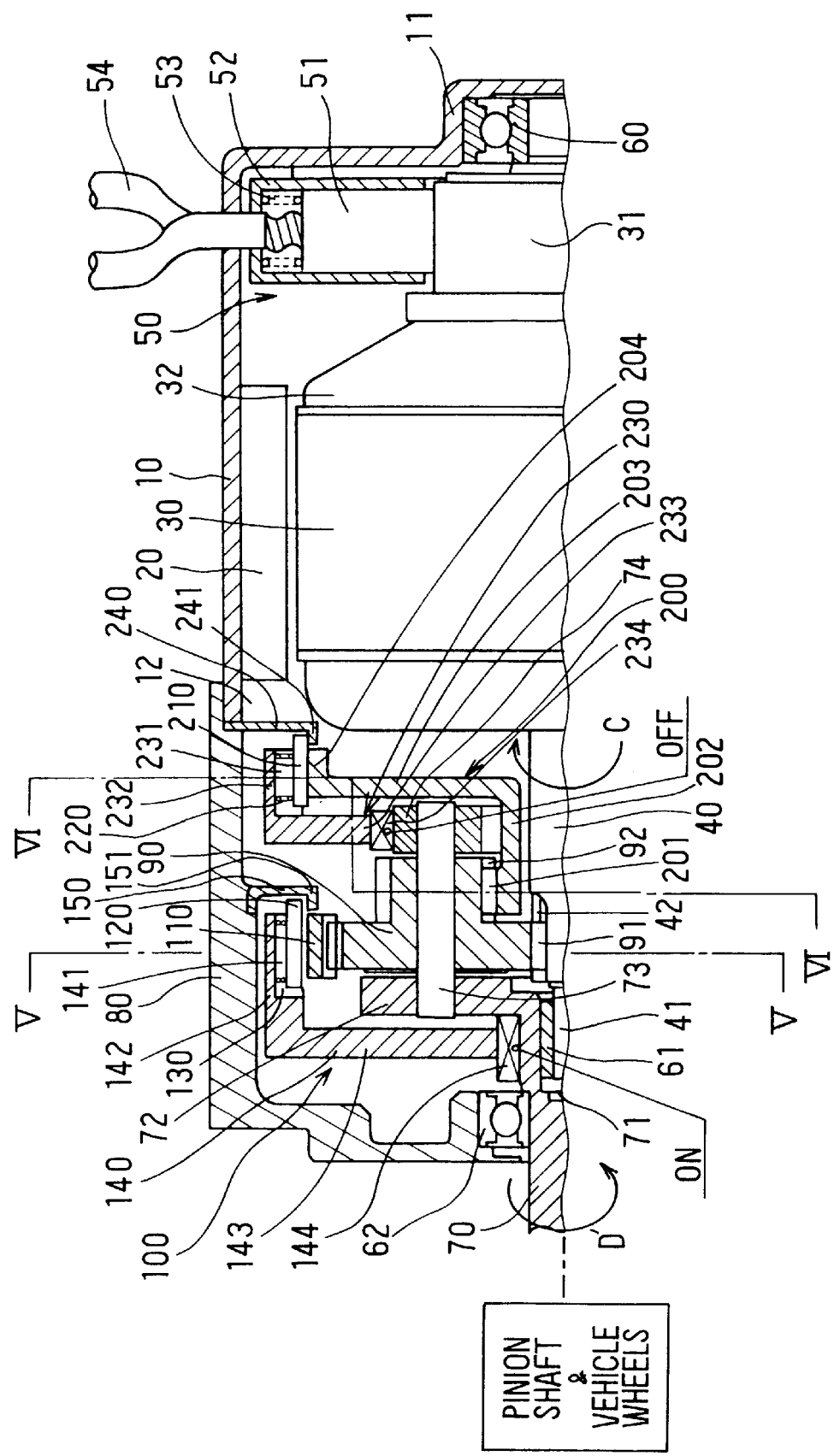
FIG. 4 is a sectional view showing a motor in its one operational mode according to the first embodiment.

As shown in FIG. 4, as the first contact member 120 is housed in the housing 141 formed by the cylindrical part 142 of the first bracket 140 against the first spring 130, clearance is made between the first contact member 120 and the internal gear 110. Clearance is also provided between one end of the first contact member 120 and the bent part 151 of the supporting member 150. Thus, the rotation of the internal gear 110 is not regulated relative to the housing 80.

At this time, the end face of the disc part 233 of the second bracket 230 and the circular portion 74 are released by turning OFF the second coupling/releasing member 234 and the rotation of the circular portion 74 is not transmitted to the second bracket 230.

Figure 6:
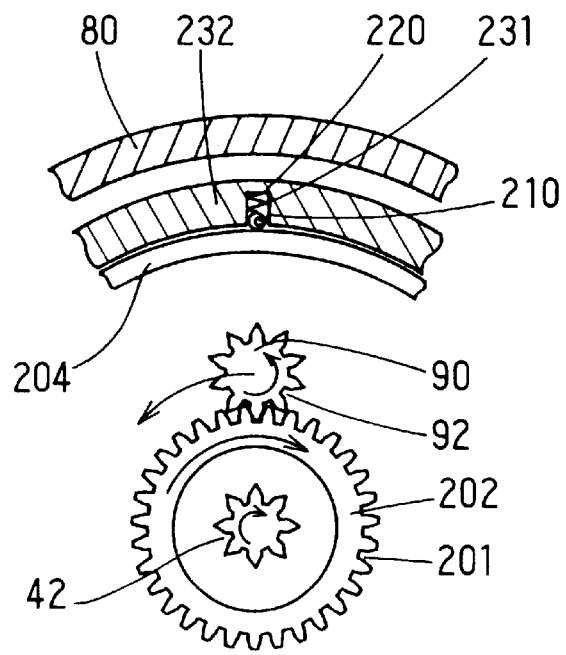
FIG. 6 is a sectional view showing a part of the motor viewed along a line VI—VI shown in FIG. 4.

Further, as shown in FIG. 6, the second contact member 210 is pressed radially on the flange part 204 of the rotation supporter 200 by the second spring 220 and one end of the second contact member 210 comes in contact with the bent part 241 of the second supporting member 240. Thus, the rotation of the rotation supporter 200 is regulated relative to the housing 80.

When the armature 30 is rotated in the direction shown by an arrow C in FIG. 4 in this state, the rotation is transmitted to the first gear 91 of the planetary gear 90 via the armature shaft 40 and the sun gear 42. As the rotation of the rotation supporter 200 is regulated relative to the housing 80 by the second contact member 210 and in the meantime, the rotation of the internal gear 110 is not regulated relative to the housing 80, the planetary gear 90 is rotated on its own axis along the periphery of the pin 73 in the direction reverse to the rotational direction C of the armature shaft 40 along the periphery of the armature shaft 40 as shown in FIG. 6. Therefore, the output shaft can be rotated in the direction (clockwise) reverse to the rotational direction of the armature shaft 40.

Therefore, as the rotational direction of the output shaft 70 is switched or reversed when the first and second coupling/ releasing members 144 and 234 sense the change of the rotational direction of a steering wheel as described above, the flow of current to the armature coil of a motor is not required to be switched. Thus, armature reaction and spark noise generation are suppressed.

The torque of the output shaft can be surely transmitted to a steering wheel without causing the delay in response by reaction by the armature of a motor when the torque of the output shaft 70 is transmitted to the steering wheel.

As the reduction gear ratio when rotation in the same direction as the armature shaft 40 is transmitted to the output shaft 70 and the reduction gear ratio when rotation in the direction reverse to the rotational direction of the armature shaft 40 is transmitted to the output shaft 70 are set to the substantially same one determined by the gear ratio of the sun gear 42 to the planetary gear 90, the torque received from the output shaft 70 can be substantially fixed and can be transmitted to a steering wheel equally clockwise and counterclockwise.

The rotational direction of the output shaft 70 may be switched based upon the change of the torque operating upon the output shaft 70. Thus, the input of a signal for switching the rotational direction can be made unnecessary.

The torque received from the output shaft 70 can be set according to a situation by differentiating the reduction gear ratio when rotation in the same direction as the armature shaft 40 is transmitted to the output shaft 70 and the reduction gear ratio when rotation in the direction reverse to the rotational direction of the armature shaft 40 is transmitted to the output shaft 70 in a predetermined range and for example, when torque is transmitted to a steering wheel, the load of a driver can be also reduced by changing the degree of assistance in the clockwise or counterclockwise rotational direction of the steering wheel in view of the situation of a road condition and a running condition such as turning to the left and turning to the right.

Further, delay in return to a neutral position caused by the inertia of the armature generated in the output shaft 70 by an epicyclic reduction gear can be eliminated by preventing the transmission of rotation between the armature shaft 40 and the output shaft 70 when a steering gear is in neutral and the steering gear can be returned promptly to a neutral position. A method of interrupting the transmission of rotation will be described below.

Figure 5:
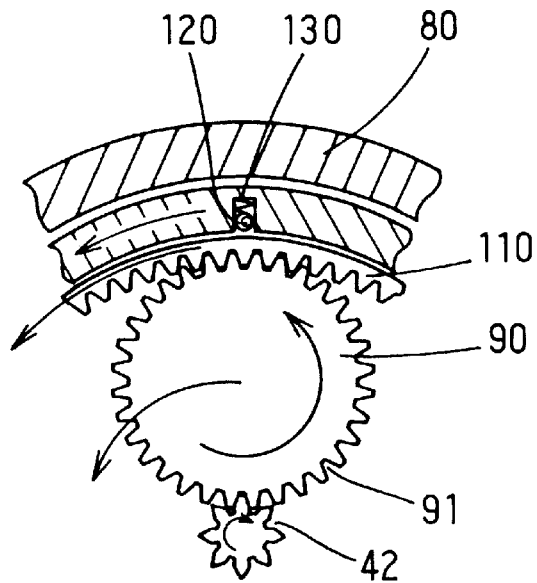
FIG. 5 is a sectional view showing a part of the motor viewed along a line V—V in FIG. 4.

First, as shown in FIGS. 4 and 5, when the first contact member 120 is housed in the housing 141 formed by the cylindrical part 142 of the first bracket 140 against the first spring 130, clearance is provided between the first contact member 120 and the internal gear 110. Clearance is also provided between one end of the first contact member 120 and the bent part 151 of the first supporting member 150. Thus, the rotation of the internal gear 110 is not regulated relative to the housing 80.

At that time, as shown in FIG. 3, when the second contact member 210 is housed in the housing formed by the cylindrical part 232 of the second bracket 230 against the second spring 220, clearance is provided between the second contact member 210 and the flange part 204 of the second bracket 230.

Therefore, the rotation of the planetary gear 90 is not regulated by the internal gear 110 and the rotation supporter 200, rotation from the output shaft 70 only idles the planetary gear 90 along the periphery of the pin 73, rotation to the armature shaft 40 is not transmitted and the inertia of the armature generated in the output shaft 70 can be eliminated.

Further, a rotational direction may be also switched not by a signal of torque, a rotational direction, a rotational angle or the like from the output shaft 70 but by a signal from a torque sensor or the like provided on a steering shaft and thus, more timely and finer control is enabled.

(Second Embodiment)

Next, referring to FIGS. 7 to 12, a second embodiment of a steering gear according to the present invention will be described.

A motor 300 has substantially the same constitution as the motor described in the first embodiment and comprises a cylindrical yoke 310, a plurality of field cores 321 and a stator coil 322 wound on the field core 321 constituting a stator 320 fixed on the inner face of this yoke 310 by a screw 311, an armature 330 provided inside the stator 320 and provided with a commutator 332 at one axial end thereof on which an armature coil 331 is wound, an armature shaft 340 for supporting the armature 330 and a brush mechanism 350 for supplying current to the commutator 332 of the armature 330. This brush mechanism 350 is constituted by a brush 351 which is in contact with the commutator 332, a brush holder 352 for holding this brush 351 and a brush spring 353 for pressing the brush 351 radially outwardly on the side of the commutator 332.

One end of the armature shaft 340 is supported by a bearing 361 housed in a rear frame 360 coupled to one end of the yoke 310 using a faucet joint so that the armature shaft 340 can be rotated. The brush holder 352 is held between the rear frame 360 and the yoke 310.

A sun gear 341 is formed at the other end of the armature shaft 340. The other end of the armature shaft 340 is supported by a bearing 371 housed in a front frame 370 coupled to the other end of the yoke 310 using a faucet joint so that the armature shaft 340 can be rotated. Further, the yoke 310 is held between the front frame 370 and the rear frame 360 and fixed firmly by a through bolt 380.

Next, a rotation reversing mechanism 400 for transmitting the rotation by reversing the unidirectional rotation of the motor 300 to a pinion shaft 610 will be described.

Figure 11:
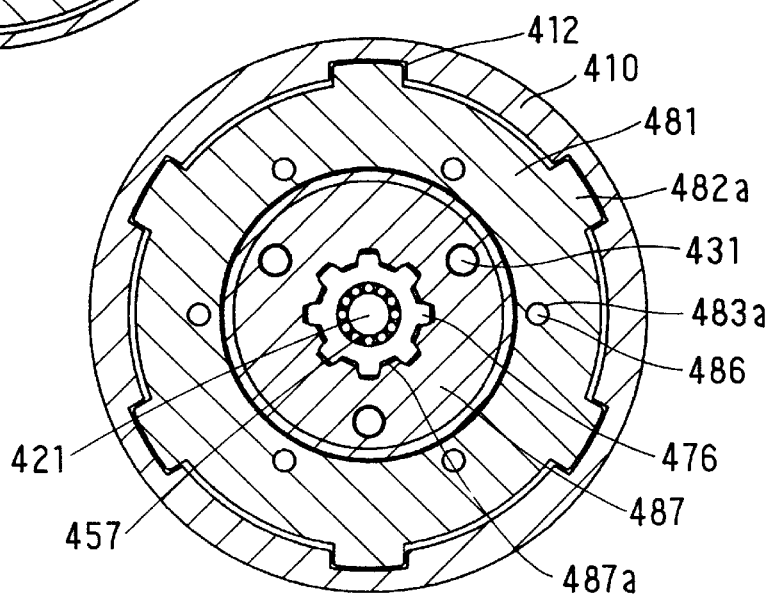
FIG. 11 is a sectional view viewed along a line XI—XI in FIG. 8.
Figure 12:
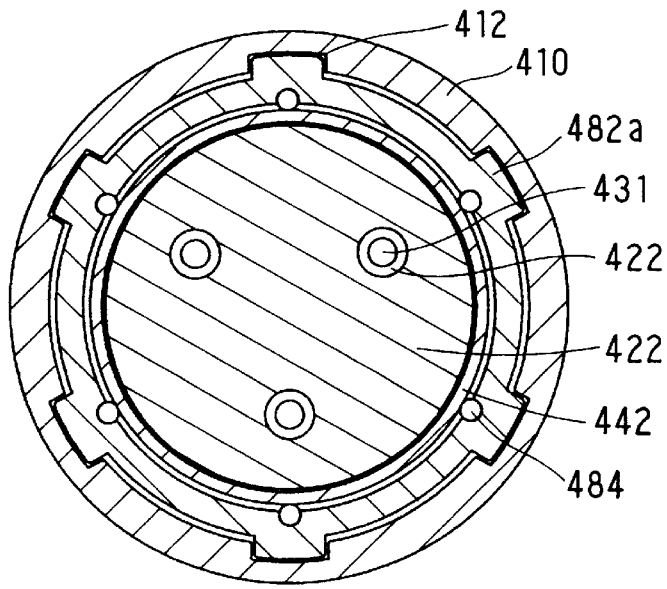
FIG. 12 is a sectional view viewed along a line XII—XII in FIG. 8.

A portion different in level 411 is respectively formed on the inner face at both ends of a cylindrical case 410 and six concave portions 412 are formed at an equal angular interval along the periphery thereof on the central inner face thereof as shown in FIG. 11 or 12.

One end 421 of an output shaft 420 provided in the center of the case 410 is supported by a bearing 343 in the concave portion 342 formed at the other end of the armature shaft 340 so that the output shaft can be rotated and the output shaft 420 is arranged on the same axis as the armature shaft 340. A disc projection 422 integrated with the output shaft 420 is formed at one end 421 of the output shaft 420.

A planetary gear 430 has its inside engaged with the sun gear 341 of the armature shaft 340 and has its periphery engaged with an internal gear formed on the inner face of a first rotator 440. A cylindrical part 442 extended on the side reverse to the side of the internal gear 441 on the peripheral side of which a conic slope 443 is formed and a flange part 444 extended on the peripheral side in the direction of the diameter thereof are integrated in the first rotator 440. The end of the flange part 444 is housed in the portion different in level 411 at one end of the case 410, and a plate 445 and a roller bearing 446 are housed in space formed among the portion different in level 411 of the case 410, the flange part 444 of the first rotator 440 and the front frame 370. The first rotator 440 is supported by the roller bearing 446 so that the first rotator can be rotated.

The planetary gear 430 is attached to one end of a supporting pin 431 and a gear 432 is formed at the other end thereof. This supporting pin 431 is supported by the disc projection 422 of the output shaft 420 via the bearing 433 so that the supporting pin can be rotated. Three supporting pins 433 are provided at an equal interval along the periphery of the output shaft as shown in FIGS. 10 to 12 and respectively support three planetary gears 430 so that any planetary gear can be rotated.

An external gear 451 engaged with the inside of the gear 432 in the direction of the diameter thereof formed at the other end of the supporting pin 431 is formed inside a second rotator 450. A cylindrical part 452 which is extended on the side of the cylindrical part 442 of the first rotator 440 and on the peripheral side of which a conic slope 453 is formed and a flange part 454 extended on the peripheral side in the direction of the diameter thereof are integrated on the peripheral side of the second rotator 450. The end of this flange part 454 is housed in the portion different in level 411 at the other end of the case 410, and a plate 455 and a roller bearing 456 are housed in space formed among the portion different in level 411 of the case 410, the flange part 454 of the second rotator 450 and a bracket 460. The second rotator 450 is supported by this roller bearing 456 and a bearing 457 so that the second rotator can be rotated as the first rotator 440.

Figure 10:
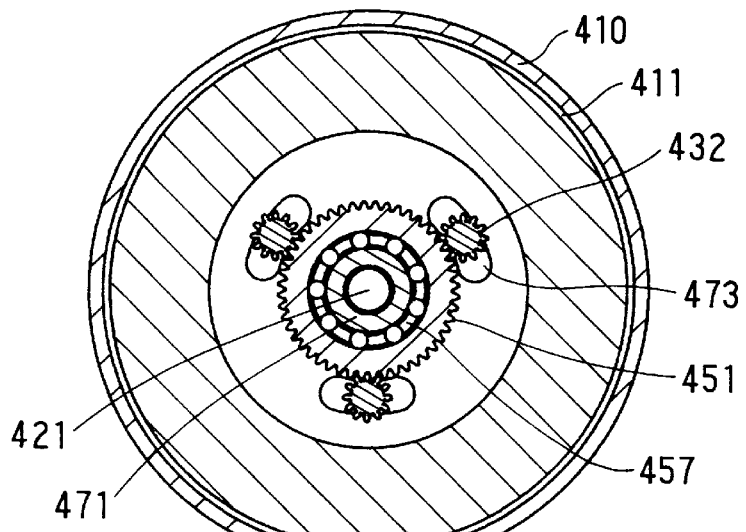
FIG. 10 is a sectional view viewed along a line X—X in FIG. 8.

A rotation transmitting mechanism 470 comprises a first cylindrical part 471 extended axially along the output shaft 420 with a predetermined gap between the first cylindrical part and the output shaft and a disc part 472 extended from the first cylindrical part 471 to the cylindrical part 452 of the second rotator 450 and a longitudinal hole 473 through which the supporting pin 431 passes as shown in FIG. 10 is formed through this disc part 472. A second cylindrical part 474 which is extended from the disc part 472 to the disc projection 422 of the output shaft 420, on the inner face of which a difference in level 475 is formed and on the periphery of which a helical spline 476 is formed is integrated. A bearing 477 is provided in the difference in level 475 of the second cylindrical part 474 and the rotation transmitting mechanism 470 is supported so that the mechanism can be rotated independent of the output shaft 420.

A regulating mechanism 480 comprises a regulating member 481 provided in the case 410 and this regulating member 481 comprises a circular part 482 extended axially and a protruded part 483 extended from this circular part 482 to the inside. A projection 482a fitted into the concave portion 412 of the case 410 is formed on the periphery of the circular part 482. The regulating member 481 can be moved axially without being rotated between the concave portion 412 of the case 410 and the projection 482a. First and second housings 482b and 482c for respectively housing a first ball 484 and a second ball 485 are formed in a position respectively opposite to the slope 443 of the cylindrical part 442 of the first rotator 440 and the slope 453 of the cylindrical part 452 of the second rotator 450 inside the circular part 482. Further, a through hole 483a extended axially is formed through the protruded part 483 of the regulating member 481 and a third ball 486 is housed in this through hole 483a.

A moving member 487 is provided with a spline 487a fitted to the helical spline 476 of the second cylindrical part 474 of the rotation transmitting mechanism 470 inside and is fixed to the supporting pin 431. A housing 487b for housing the protruded part 483 of the regulating member 481 and the third ball 486 is formed outside this moving member 487.

A coupling member 500 transmits the rotation of a stub shaft 620 to the rotation reversing mechanism 400 and also transmits the rotation of the motor 300 to the pinion shaft 610. This coupling member 500 comprises a housing 510, a first bevel gear 520 supported in this housing 510 via a first bearing 511 so that the first bevel gear can be rotated and a second bevel gear 530 supported via a second bearing 512 so that the second bevel gear can be rotated. The other end 423 of the output shaft 420 is press-fitted into the concave portion 521 of the first bevel gear 520.

A first gear 540 is fixed on the periphery of the rotation transmitting mechanism 470 on the side of the first bevel gear 520 and further, a second gear 550 engaged with the first gear 540 is fixed in the concave portion 531 of the second bevel gear 530.

A steering shaft mechanism 600 comprises the pinion shaft 610 coupled to vehicle wheels not shown, the stub shaft 620 coupled to a steering wheel not shown and a torsion bar 630 inserted into the concave portion 611 of the pinion shaft 610 and into the concave portion 621 of the stub shaft 620, and both ends of this torsion bar 630 are respectively fixed on the pinion shaft 610 and stub shaft 620 by pins 612 and 622. The pinion shaft 610 and the stub shaft 620 are supported by a bearing 640 so that they can be rotated relatively.

A first disc gear 650 engaged with the first bevel gear 520 of the coupling member 500 is provided on the periphery of the pinion shaft 610 so that the rotation of the motor 300 is transmitted to the pinion shaft 610. A second disc gear 660 engaged with the first bevel gear 520 of the coupling member 500 is provided on the periphery of the stub shaft 620 so that the rotation of the stub shaft 620 is transmitted to the second gear 550 via the second bevel gear 530.

A case 670 for supports the stub shaft 620 via a ball bearing 680 so that the stub shaft can be rotated and for housing the first and second disc gears 650 and 660 inside. The housing 510 of the coupling member 500 is fixed to this case 670.

Next, the operation of the power steering will be described next with respect to a case that the stub shaft 620 in the steering shaft mechanism 600 is rotated in the direction shown by an arrow X in FIG. 7 by a driver.

First, the torsion bar 630 is twisted to rotate the stub shaft 620 and the stub shaft starts to rotate relative to the pinion shaft 610. The second disc gear 660 starts to be rotated in the same direction as the stub shaft 620 by this rotation and the second bevel gear 530 is rotated in the direction shown by an arrow Y. The rotation transmitting mechanism 470 of the rotation reversing mechanism 400 is rotated via the second gear 550 and the first gear 540 by the rotation of this second bevel gear 530.

Figure 8:
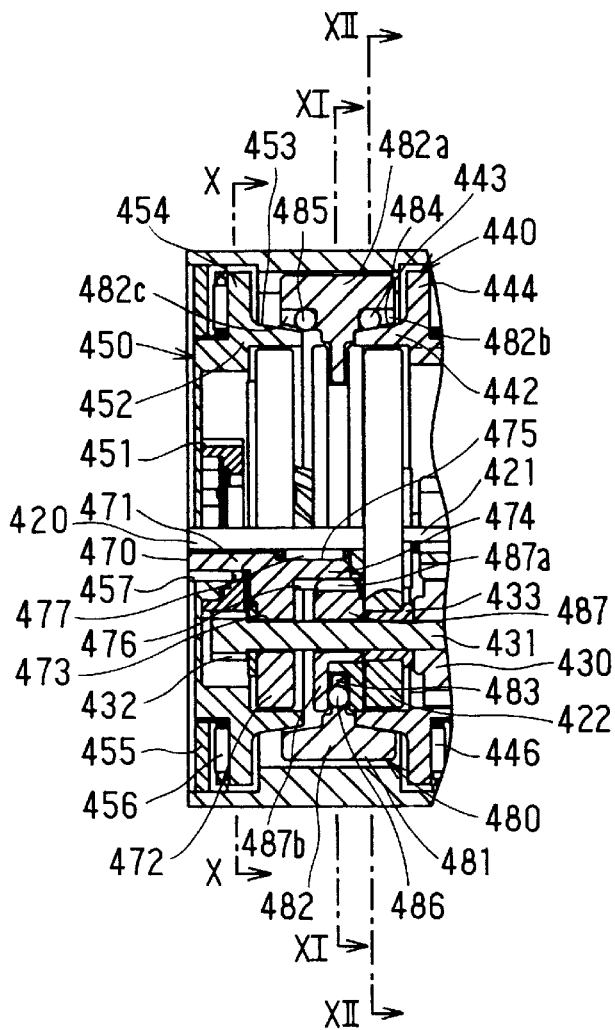
FIG. 8 is an enlarged sectional view showing a main part of the power steering device in its one operational state.

The helical spline 476 of the second cylindrical part 474 is rotated by the rotation of the rotation transmitting mechanism 470 and the moving member 487 the spline 587a of which is coupled to this helical spline 476 is moved turning along the spline to the side of the motor 300. The regulating member 481 housed in the housing 487b of this moving member 487 is also moved axially by the movement of the moving member 487, the first ball 484 housed in the first housing 482b of the circular part 482 of the regulating member 481 comes in contact with and presses upon the slope 443 of the cylindrical part 442 of the first rotator 440, and as a result, the rotation of the first rotator 440 is regulated. It is because the rotation of the regulating member 481 is regulated as the projection 482a of this regulating member 481 is fitted into the concave portion 412 of the case 410. FIG. 8 shows a state in which the rotation of the first rotator 440 is regulated.

The rotation of the first rotator 440 is regulated, while the rotation of the second rotator 450 is not regulated because the regulating member 481 is moved to the side of the first rotator 440 and the second rotator 450 can be rotated owing to the roller bearing 456 and the bearing 457.

An electric switch not shown is turned on by the axial movement of the moving member 487 to turn on the motor 300 and the armature shaft 340 is rotated in the direction shown by an arrow Z. The rotation of this armature shaft 340 is transmitted to the planetary gear 430 via the sun gear 341. At this time, as the rotation of the first rotator 440 is regulated by the regulating member 481 as described above, the rotational speed of the armature shaft 340 is reduced in predetermined reduction gear ratio determined by the sun gear 341 and the internal gear 441 by the revolution of the planetary gear 430 and rotation in the same direction as the rotation of the armature shaft 340 is transmitted to the output shaft 420 via the supporting pin 431. The second rotator 450 provided with the external gear 451 engaged with the gear 432 formed at the other end of the supporting pin 431 is only rotated without being regulated.

Therefore, the rotation of the output shaft 420 is transmitted to the first bevel gear 520 and rotation in the same direction as the rotation of the stub shaft 620 is transmitted to the pinion shaft 610 via the first disc gear 650. Thus, the rotational speed of the motor 300 is reduced and transmitted to the pinion shaft 610, and as a result, a wheel can be readily moved.

Figure 7:
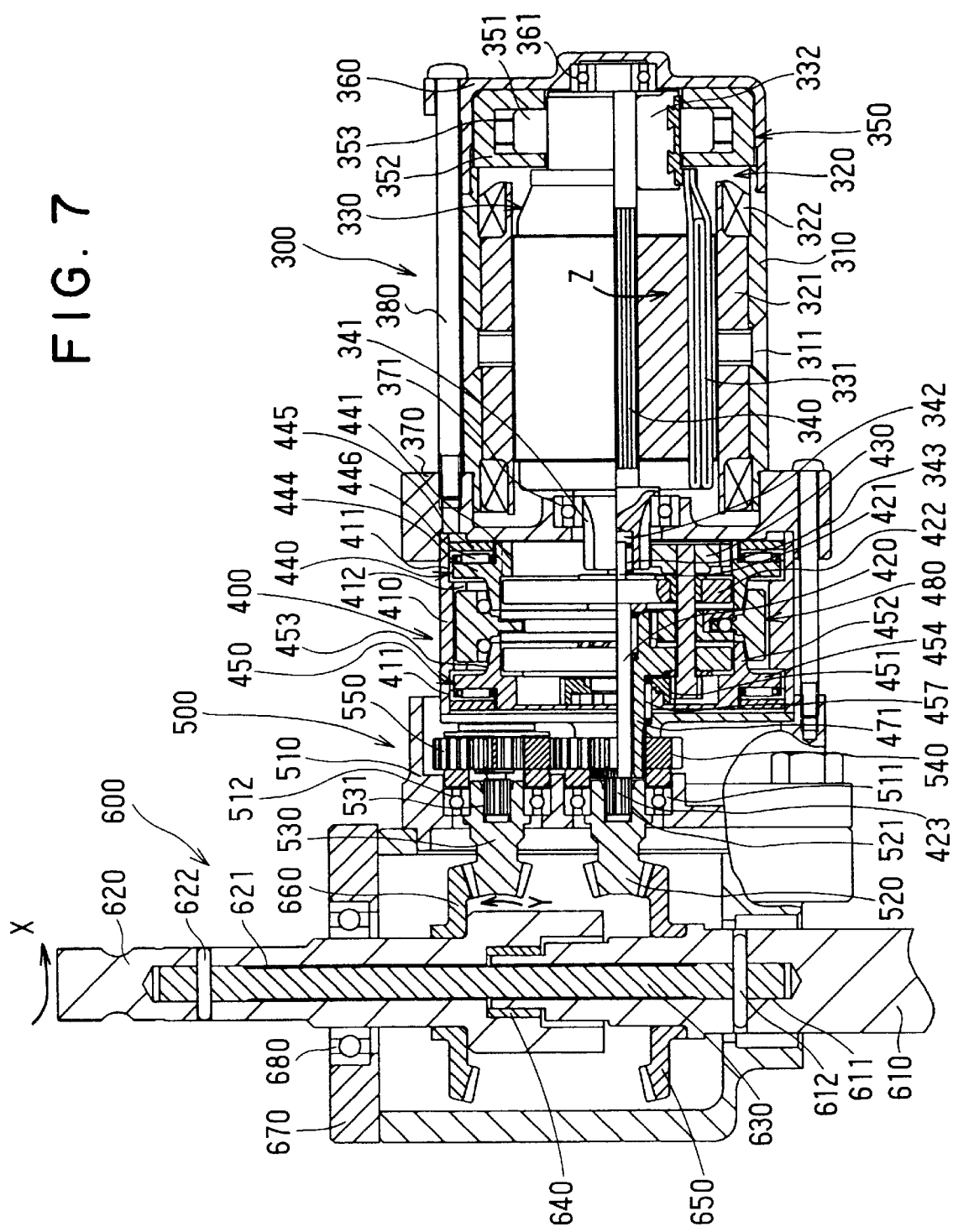
FIG. 7 is a sectional view showing a power steering device according to a second embodiment of the present invention.

In the meantime, when the stub shaft 620 of the steering shaft mechanism 600 is rotated in the direction reverse to the direction shown by the arrow X in FIG. 7, the torsion bar 630 is twisted to rotate the stub shaft 620. The stub shaft 620 starts to be rotated relative to the pinion shaft 610, the second disc gear 660 starts to be rotated in the same direction as the rotation of the stub shaft 620 and the second bevel gear 530 is rotated in the direction reverse to the direction shown by the arrow Y. The rotation transmitting mechanism 470 of the rotation reversing mechanism 400 is rotated in the reverse direction via the second gear 550 and the first gear 540 by the rotation of this second bevel gear 530.

Figure 9:
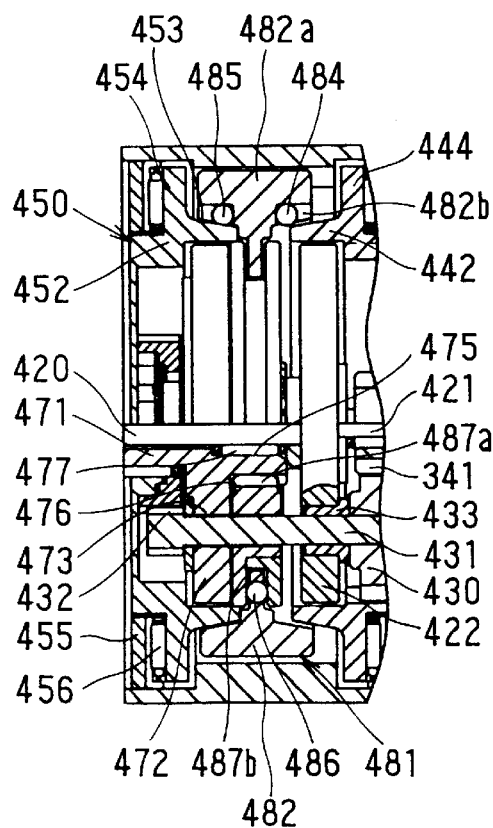
FIG. 9 is an enlarged sectional view showing the main part of the power steering device in its other operational state.

The helical spline 476 of the second cylindrical part 474 is rotated by the rotation in the reverse direction of the rotation transmitting mechanism 470 and the moving member 487 the spline 487a of which is coupled to this helical spline 476 is moved along the spline turning not on the side of the motor 300 but on the side of the second rotator 450. The regulating member 481 housed in the housing 487b of this moving member 487 is also moved axially by the movement of the moving member 487 and the second ball 485 housed in the second housing 482c of the circular part 482 of the regulating member 481 comes in contact with the slope 453 of the cylindrical part 452 of the second rotator 450 and presses upon it, and as a result, the rotation of the second rotator 450 is regulated. It is because the rotation of the regulating member 481 is regulated as the projection 482a of this regulating member 481 is fitted into the concave portion 412 of the case 410. FIG. 9 shows a state in which the rotation of the second rotator 450 is regulated.

The rotation of the second rotator 450 is regulated, while the rotation of the first rotator 440 is not regulated because the regulating member 481 is moved to the side of the second rotator 450 and the first rotator 440 can be rotated by the roller bearing 446 and the bearing 447.

The electric switch not shown is turned on by the axial movement of the moving member 487 to turn on the motor 300 and the armature shaft 340 is rotated in the direction shown by the arrow Z (in FIG. 7) as described above. This rotation of the armature shaft 340 is transmitted to the planetary gear 340 via the sun gear 341. At this time, as the rotation of the first rotator 440 is not regulated by the regulating member 481 as described above, the first rotator is only rotated, however, as the rotation of the second rotator 450 is regulated, the supporting pin 431 provided with the gear 432 engaged with the external gear 451 of the second rotator 450 is rotated in the direction reverse to the rotational direction of the armature shaft 340. Therefore, the rotational speed of the supporting pin is reduced in predetermined reduction gear ratio determined by the external gear 451 and the gear 432 of the second rotator 450 and rotation in the direction reverse to the rotational direction of the armature shaft 340 is transmitted to the output shaft 420 via the supporting pin 431. Predetermined reduction gear ratio determined by the external gear 451 of the second rotator 450 and the gear 432 and predetermined reduction gear ratio determined by the sun gear 341 and the internal gear 441 of the first rotator 440 are set to the same value. Therefore, this rotation is transmitted to the first bevel gear 520 by the rotation of the output shaft 420 and rotation in the same direction as the rotation of the stub shaft 620 is transmitted to the pinion shaft 610 via the first disc gear 650. Thus, the rotational speed of the motor 300 is reduced, the reduced rotational speed is transmitted to the pinion shaft 610 and a wheel can be readily moved.

When a steering is in a neutral state, rotation is not transmitted to the rotation transmitting mechanism 470, therefore the regulating member 481 is not also moved and the motor 300 is not turned on. The first and second rotators 440 and 450 can be rotated without the rotation being regulated because the regulating member 481 is not moved.

Therefore, as the rotational direction of the output shaft 420 is switched by sensing the change of the rotational direction of a steering wheel (the rotational direction of the stub shaft 620) by the movement of the regulating member 480 by the rotation of the rotation transmitting mechanism 470 as described above, the flow of current to the armature coil 331 of the motor 330 is not required to be switched and the armature reaction and the spark noise generation are suppressed. When the torque of the output shaft 420 is transmitted to a steering side, it can be surely transmitted to the steering wheel without causing the delay in response by the armature reaction of the motor.

The torque received from the output shaft 420 can be set according to a situation by differentiating predetermined reduction gear ratio determined by the external gear 451 of the second rotator 450 and the gear 432 and predetermined reduction gear ratio determined by the sun gear 341 and the internal gear 441 of the first rotator 440 in a predetermined range and for example, when torque is transmitted to a steering wheel, the load to a driver can be also reduced by changing the degree of assistance in the clockwise or counterclockwise rotational direction of the steering wheel in view of the road condition and the running condition such as turning to the left and turning to the right.

Further, as the rotation of the first and second rotators 440 and 450 are not regulated when the steering device is in a neutral state, delay in return to the neutral position caused by the inertia of the armature generated in the output shaft 420 by a reduction gear can be eliminated by preventing the transmission of rotation between the armature shaft 340 and the output shaft 420 when a steering device is in neutral, and the steering can be returned promptly to a neutral position.

The motor 300 may be also turned on not by the movement of the regulating member 481 but by a signal from a torque sensor or the like provided on a steering shaft or the like. The gear 432 may be mounted on the supporting pin 431 rotatably of fixedly.

(Third Embodiment)

Figure 13:
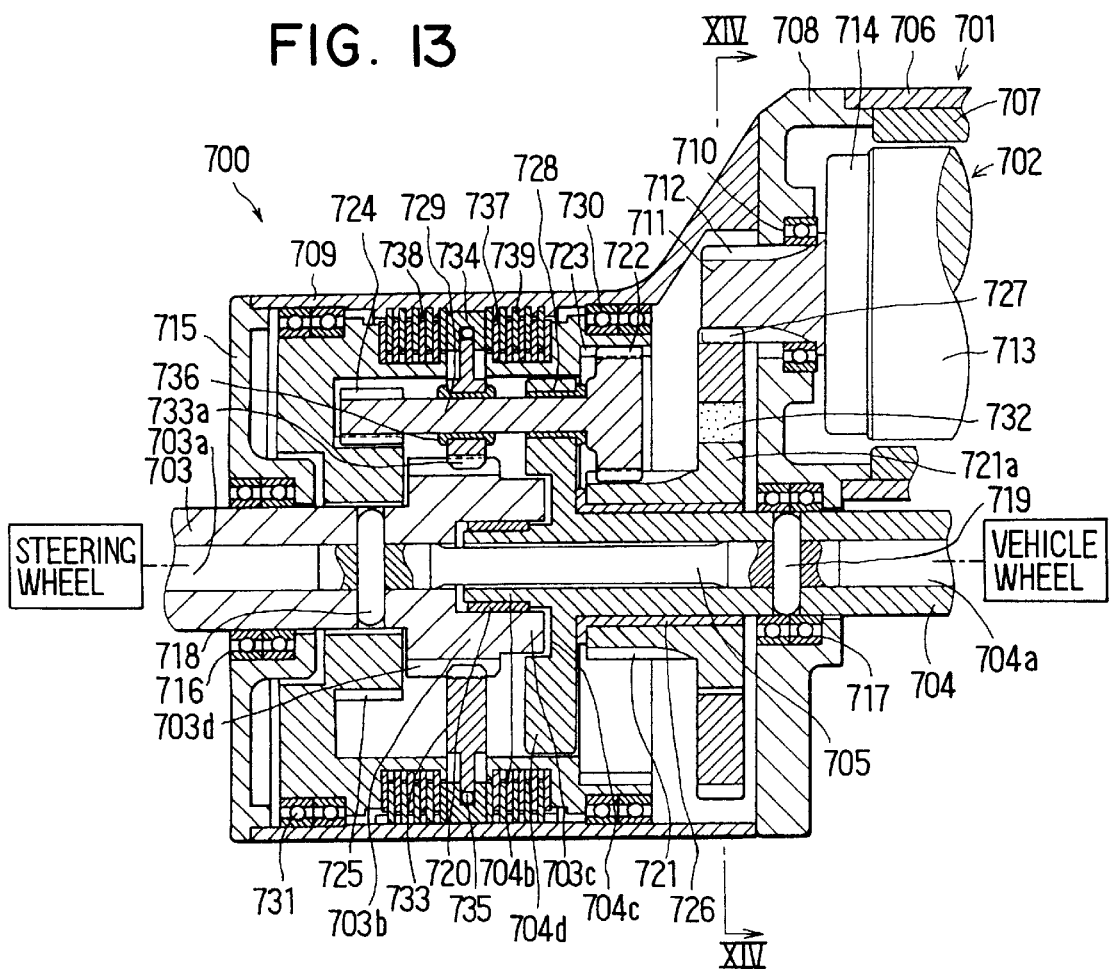
FIG. 13 is a sectional view showing a power steering device according to a third embodiment of the present invention.
Figure 14:
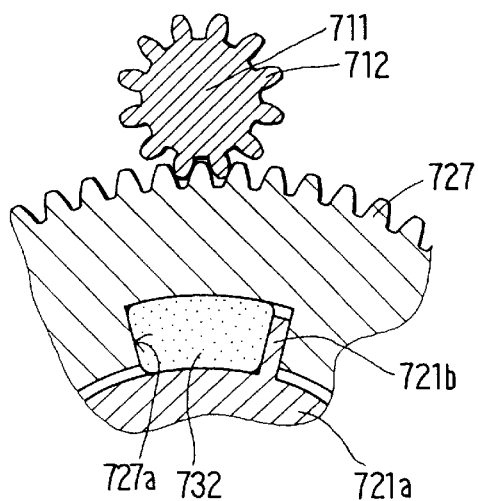
FIG. 14 is a sectional view viewed along a line XIV—XIV in FIG. 13.

In the third embodiment shown in FIGS. 13 and 14, an electrically driven power steering device 700 of the present preferred embodiment is constituted by an electric motor 2 for generating a rotational force, a steering shaft (a stub shaft 703 as an input-side shaft, a pinion shaft 704 as an output-side shaft, a torsion bar 705) for coupling a steering wheel to a vehicle wheel, a planetary gear type speed reduction mechanism for reducing the rotation of the electric motor 701 and transmitting it to the pinion shaft 704, and a switching mechanism for switching the rotational direction of the speed reduction mechanism according to the rotational direction of the stub shaft 703.

The electric motor 701 has a cylindrical yoke 706, a plurality of permanent magnets 707 fixed to the inner peripheral surface of the yoke 706, an armature 702 disposed inside the permanent magnets 707, a brush unit (not shown) for supplying electricity to the armature 702 and the like and is fixed to a clutch case 209 with bolts via a center case 208.

The armature 702 is provided with an armature shaft 711 which is rotatably supported by a bearing 710 fixed to the center case 708 and a bearing (not shown) fixed to an end frame (not shown) and the armature shaft 711 is disposed on a different axis relative to the steering shaft. The armature shaft 711 is nearly parallel to the steering shaft in this embodiment. An armature gear 712 for transmitting the rotation of the armature 702 is formed on one end of the armature shaft 711.

On the outer periphery of the armature shaft 711 is fitted an armature core 713 constituted by a plurality of laminated thin steel sheets and on the armature core 713 is wound an armature coil 714. On the outer periphery of the other end of the armature shaft 711 is mounted a commutator (not shown) which is electrically mechanically coupled to the armature coil 714.

The armature 702 of the electric motor 701 is rotated only in one direction, that is, the armature 702 is rotated counterclockwise when viewed from the left side in FIG. 13.

The steering shaft is constituted by the stub shaft 703 coupled to the steering wheel, the pinion shaft 704 engaged with the rack gear of the vehicle wheel side, and the torsion bar 705 for coaxially coupling the stub shaft 703 to the pinion shaft 704. The stub shaft 703 is rotatably supported by a bearing 716 fixed to a cover 715 fitted in the clutch case 709. The pinion shaft 704 is disposed opposite to the stub shaft 703 in the axial direction and is rotatably supported by a bearing 717 fixed to the center case 708.

The torsion bar 705 is inserted into the hollow space 703a of the stub shaft 703 and the hollow space 704a of the pinion shaft 704 and is prevented from being rotated by pins 718 and 719 in regard to the shafts 703 and 704.

A cylindrical portion 704b formed in the pinion shaft 704 is fitted in the cylindrical portion 703b formed in the stub shaft 703 via a bearing 720. The bearing 720 can relatively rotate both shafts 703 and 704 on the same axis as when a difference in a relative angle between both shafts 703 and 704 is generated by the torsion of the torsion bar 705. Further, a projection 703c formed on the end portion of the stub shaft 703 is fitted in a depression 704c formed on the end portion of the pinion shaft 704 with a small gap in the circumferential direction to form a mechanical stopper for regulating the torsion angle of the torsion bar 705. The durability of the torsion bar 705 is ensured by the mechanical stopper.

The speed reduction mechanism is constituted by a first sun gear 721 to which the rotation of the armature 702 is transmitted, a first planetary gear 722 which is engaged with the first sun gear and revolves around the first sun gear 721, an internal gear 723 engaged with the external teeth of the first planetary gear 722, a second planetary gear 724 which is disposed on the same axis as the first planetary shaft 729 and is integrally rotated therewith and a second sun gear 725 engaged with the external teeth of the second planetary gear 724.

The first sun gear 721 is rotatably fitted on the outer periphery of the pinion shaft 704 via a bearing 726 and the rotation of the armature 702 is transmitted thereto via a third sun gear 727 which is rotated integrally with the first sun gear 721. The first planetary gear 722 is integrated with a supporting pin 729 which is rotatably supported by a flange portion 4d formed on the pinion shaft 704 via a bearing 728. The internal gear 723 is rotatably supported by the inner periphery of the clutch case 709 via a bearing 730.

The second planetary gear 724 is integrated with the supporting pin 729 at the side opposite to the first planetary gear 722. Therefore the second planetary gear 724 is integrally rotated with the supporting pin 729 and the first planetary gear 722. In this respect, a plurality of supporting pins 729 are disposed at equal angular intervals in the circumferential direction of the flange portion 4d and each supporting pin 29 is integrated with the first planetary gear 722 and the second planetary gear 724.

The second sun gear 725 is disposed on the outer periphery of the stub shaft 703 and is coaxial with the stub shaft 703 and is rotatably supported by the inner peripheral surface of the clutch case 709 via a bearing 731.

Further, the module m1 and the number of teeth Z1 of the first planetary gear 722 and the module m2 and the number of teeth Z2 of the second planetary gear 724 are set to satisfy the following equation:

$$Z1 = 3 \cdot (m2/m1) \cdot Z2$$

This equation is obtained as follows. Letting the module and the number of teeth of the first planetary gear 722 be m1 and Z1, the module and the number of teeth of the second planetary gear 724 be m2 and Z2, the module and the number of teeth of the first sun gear 721 be m1 and Z3, the module and the number of teeth of the internal gear 723 be m1 and Z4, and the module and the number of teeth of the second sun gear 725 be m2 and Z5, the following equation is obtained:

$$Z4 = 2 \cdot Z1 + Z3 \tag{1}$$

$$m1 \cdot (Z1 + Z3) = m2 \cdot (Z2 + Z5) \tag{2}$$

Further, the following equation is obtained from a condition that a reduction ratio i in the normal rotation and a reduction ratio i in the reverse are the same for the case where the rotation of the internal gear 723 is regulated and the case where the rotation of the sun gear 725 is regulated.

$$1 + (Z4/Z3) = i \tag{3}$$

$$(Z5/Z2) \cdot (Z1/Z3) - 1 = i \tag{4}$$

Substituting the equation (3) into the equation (1), $$Z3 = 2/(i-2) \cdot Z1 \tag{5}$$

Substituting the equation (4) into the equation (5), $$Z5 = 2 \cdot (i+1)/(i-2) \cdot Z2 \tag{6}$$

Substituting the equation (5) and the equation (6) into (2), $$Z1 = 3 \cdot (m2/m1) \cdot Z2$$

In this respect, the module of the first planetary gear 722 and that of the second planetary gear 724 are set to the same value and the number of teeth of the first planetary gear 722 is set to 724 and the number of teeth of the second planetary gear 724 is set to 8. Further, the number of teeth of the first sun gear 721 is set to 33 and the number of teeth of the internal gear 723 is set to 81 and the number of teeth of the second sun gear 725 is set to 49.

In this speed reduction mechanism, if either the rotation of the internal gear 723 or that of the second sun gear 725 is regulated and the rotation of the other gear is enabled by the switching mechanism, the first planetary gear 722 and the second planetary gear 724 are integrally rotated (revolve) with the supporting pins 729 to transmit the rotational force to the pinion shaft 704 via the flange portion 704d.

The third sun gear 727 is disposed on the outer periphery of a portion 721a with a large diameter provided on the end portion in the axial direction of the first sun gear 721 and is coaxial with portion 721a and is engaged with the armature gear 712 and transmits the rotation of the armature 702 to the first sun gear 721 via an elastic member 732 as a damping material. As shown in FIG. 14, the elastic material member 732 and a projection 721b provided on the outer periphery of the portion 721a with a large diameter are housed in a depression 727a formed inside the third sun gear 727.

The switching mechanism regulates the rotation of the internal gear 723 or the rotation of the second sun gear 725 of the speed reduction mechanism and enables the rotation of the other gear according to the rotational direction of the stub shaft 703 and is constituted by a movable member moved according to the rotation of the stub shaft 703, a rotation regulating member 734 operatively connected to the movable member 733, a multiple disc clutch (described below) formed between the rotation regulating member 734 and the internal gear 723 and the second sun gear 725 and the like.

The movable member 733 is an annular member and is provided with a helical spline 733a on the inner periphery which is engaged with a helical spline 703d formed on the outer periphery of the stub shaft 703 and is rotatably supported by the rotation regulating member 734 disposed on the outer periphery of the movable member 733 via a bearing 735. Further, the movable member 733 is slidably supported by the supporting pins 729 via a cylindrical bearing 736 such that it can be slid in the axial direction of the supporting pin 729. Thus, if the stub shaft 703 is rotated in a state in which it is prevented from being rotated by the supporting pin 729, the movable member 733 can be moved in the axial direction relative to the stub shaft 703 by the action of the helical spline 733a of the movable member 733 and the helical spline 703d of the stub shaft 703d. In this respect, the direction of the movement of the movable member 733 is determined by the direction of torsion of the helical splines 733a and 703d. In this embodiment, it is assumed that the movable member 733 is moved in the left direction in FIG. 13 when the stub shaft 703 is rotated counterclockwise when viewed from the left side in FIG. 13.

The rotation regulating member 734 is straight spline-coupled to the inner periphery of the clutch case 709 and can be moved with the movable member 733 along the straight spline.

The multiple disc clutch is provided with a plurality of rotating plates 737 which are straight spline-coupled to the internal gear 723, a plurality of rotating plates 738 which are straight spline-coupled to the second sun gear 725, and a plurality of fixed plates 739 which are straight spline-coupled to the inner periphery of the clutch case 709 on both sides of the rotation regulating member 734 and the rotating plates 737 and the fixed plates 739 are alternately disposed on one side of the rotation regulating member 734 and the rotating plates 738 and the fixed plates 739 are alternately disposed on the other side of the rotation regulating member 734. A small gap is provided between each plate 737 and plate 739 and between each plate 738 and plate 739 when a difference in relative angle is not generated between the stub shaft 703 and the pinion shaft 704 by the torsion of the torsion bar 705.

If the stub shaft 703 is rotated and the movable member 733 is moved on the supporting pin 729 of this switching mechanism, the movable member 733 and the rotation regulating member 734 are moved along the straight spline to regulate the rotation of the internal gear 723 or that of the second sun gear 725 and to enable the rotation of the other gear by the multiple disc clutch.

Next, the operation of the third embodiment will be described.

When the stub shaft 703 is rotated by the steering wheel operation of the driver, a torsion is generated in the torsion bar 705 for coupling the stub shaft 703 to the pinion shaft 704 because the pinion shaft 704 is not rotated unless a rotational force above a specified value is applied thereon by a friction force produced between a wheel tire and a road (not shown). As a result, a relative rotation is produced between the stub shaft 703 and the pinion shaft 704. In this respect, since the movable member 733 is helical spline-coupled to the stub shaft 703 and is prevented from being rotated by the supporting pins 729 supported by the flange portion 704d of the pinion shaft 704, a relative rotation is generated between both shafts 703 and 704 and hence the supporting pins 729 are moved on the stub shaft 703 in the axial direction thereof. As described above, the movable member 733 is moved in the left direction in FIG. 13, when the stub shaft 703 is rotated counterclockwise when viewed from the left side in FIG. 13 and is moved in the right direction, when the stub shaft 703 is rotated clockwise when viewed from the left side in FIG. 13.

Thus, if the stub shaft 703 is rotated counterclockwise and the movable member 733 is moved in the left direction in FIG. 13, the rotation regulating member 734 is also moved to the left along the straight spline by the movement of the movable member 733. Thus, since the rotation regulating member 734 presses the rotating plates 738 which are straight spline-coupled to the second sun gear 725 and the fixed plates 739 which are straight spline-coupled to the inner periphery of the clutch case 709, the rotation of the second sun gear 725 is regulated by the friction force produced between the plates 738 and 739. At this time, the internal gear 723 can be rotated.

If the armature 702 is rotated counterclockwise in this state, the first sun gear 721 is rotated clockwise integrally with the third sun gear 727 engaged with the armature gear 712 and hence the first planetary gear 722 and the second planetary gear 724 revolve counterclockwise around the first sun gear 721 and the second sun gear 725, respectively. The revolving force is transmitted to the flange portion 704d via the supporting pins 729 to rotate counterclockwise the pinion shaft 704.

On the other hand, if the stub shaft 703 is rotated clockwise and the movable member 733 is moved in the right direction in FIG. 13, the rotation regulating member 734 is also moved to the right side along the straight spline by the movement of the movable member 733. Thus, since the rotation regulating member 734 presses the rotating plates 737 which are straight spline-coupled to the internal gear 723 and the fixed plates 739 which are straight spline-coupled to the inner periphery of the clutch case 709, the rotation of the internal gear 723 is regulated by the friction force produced between the plates 737 and 739. At this time, the second sun gear 725 can be rotated.

If the first sun gear 721 receives the rotation of the armature 702 and is rotated clockwise, the first planetary gear 722 and the second planetary gear 724 revolve clockwise around the first sun gear 721 and the second sun gear 725, respectively, and the revolving force is transmitted to the flange portion 704d via the supporting pins 729 to rotate clockwise the pinion shaft 704.

In the above third embodiment, the rotation of the armature 702 is transmitted to the first sun gear 721 via the third sun gear 727 engaged with the armature gear 712. That is, since the armature gear 712 and the third sun gear 727 which are the transmitting members for transmitting the rotational force are disposed between the electric motor 701 and the first sun gear 721, the armature shaft 711 and the steering shaft can be disposed on the different axes, for instance, the armature shaft 711 is parallel to the steering shaft and the speed reduction mechanism can be disposed on the same axis as the steering shaft. As a result, since it is not required that the armature shaft 711 is made hollow and that the electric motor 701 is disposed on the steering shaft. Thus, a problem caused by the increased outer diameter of the armature 702, that is, the deteriorated response of the armature 702 to the rotation for the steering operation of the driver can be avoided.

Further, the speed reduction mechanism is disposed on the same axis as the steering shaft and only the electric motor 701 is disposed outside in the radial direction of the steering shaft. Therefore, as compared to the case in which the electric motor 701 and the speed reduction mechanism are disposed on the different axes in regard to the steering shaft, the size of the steering shaft projecting outside in the radial direction thereof can be made smaller. As a result, the resistance to vibration of the mounting portion of the electric motor 701 and the casing for supporting the steering shaft (the clutch case 709 and the center case 708) can be improved. Further, since the size of the steering shaft projecting outside in the radial direction thereof is made smaller, the device can be easily mounted in the vehicle.

Still further, the elastic member 132 is interposed between the third sun gear 727 and the first sun gear 721. If the armature gear 712 is rotated counterclockwise in FIG. 14, the third sun gear 727 is rotated clockwise while it deflects the elastic member 732 to transmit the rotation to the projection 21b of the first sun gear 721. Thus, the elastic member 732 can absorb engaging noises produced by the backlash of the gears and an impact force applied in the direction opposite to the rotational direction of the armature 702 when the vehicle runs up the curve and hence can restrict the gears from being broken and provide a calm steering device with good durability.

The third embodiment may be modified as follows:
(1) a worm is provided on the tip of the steering shaft and a ball screw equivalent to a worm is fitted on the worm via many balls (a ball screw type);
(2) the rotation of a worm provided on the steering shaft is changed to the rotation of a sector shaft via a roller engaged with the teeth of the worm and is transmitted to a steering link mechanism (a worm roller type); and
(3) the rotation of a worm provided on the steering shaft is changed to the rotation of a sector shaft via a pin engaged with the groove of the worm and is transmitted to a steering link mechanism (a worm pin type).

Although the third sun gear 727 engaged with the armature gear 712 is provided, the armature gear 712 may be engaged directly with the first sun gear 721 without the third sun gear 727. Further, an idle gear may be interposed between the armature gear 712 and the third sun gear 727. This case has a merit that the armature shaft 711 is more freely disposed relative to the steering shaft.

It is essential only that the first sun gear 721 and the second sun gear 725 of the speed reduction mechanism be disposed on the same axis as the steering shaft. Therefore, the first sun gear 721 may be disposed on the axis of the stub shaft 703 and the second sun gear 725 may be disposed on the axis of the pinion shaft 704.

(Fourth embodiment)

Figure 15:
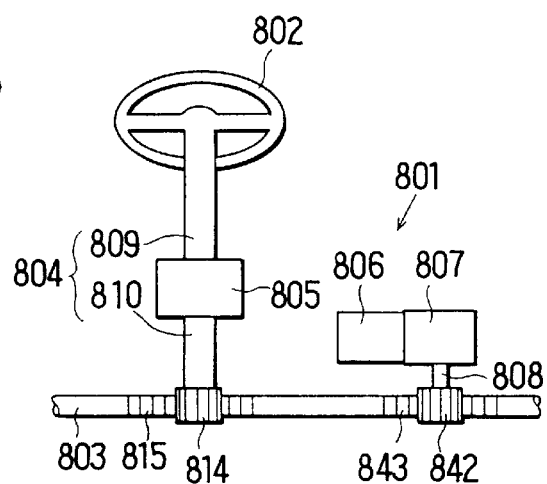
FIG. 15 is a schematic view showing a power steering device according to a fourth embodiment of the present invention.
Figure 16:
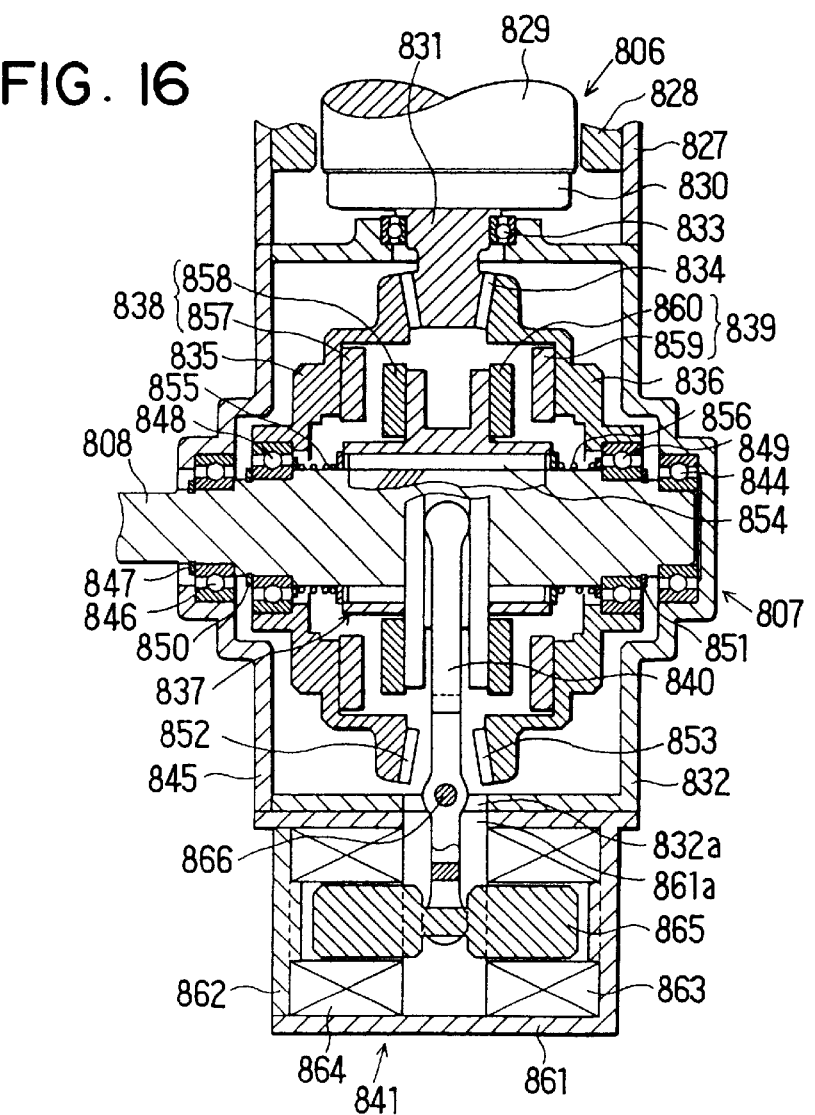
FIG. 16 is a sectional view of a switching unit used in the fourth embodiment.
Figure 17:
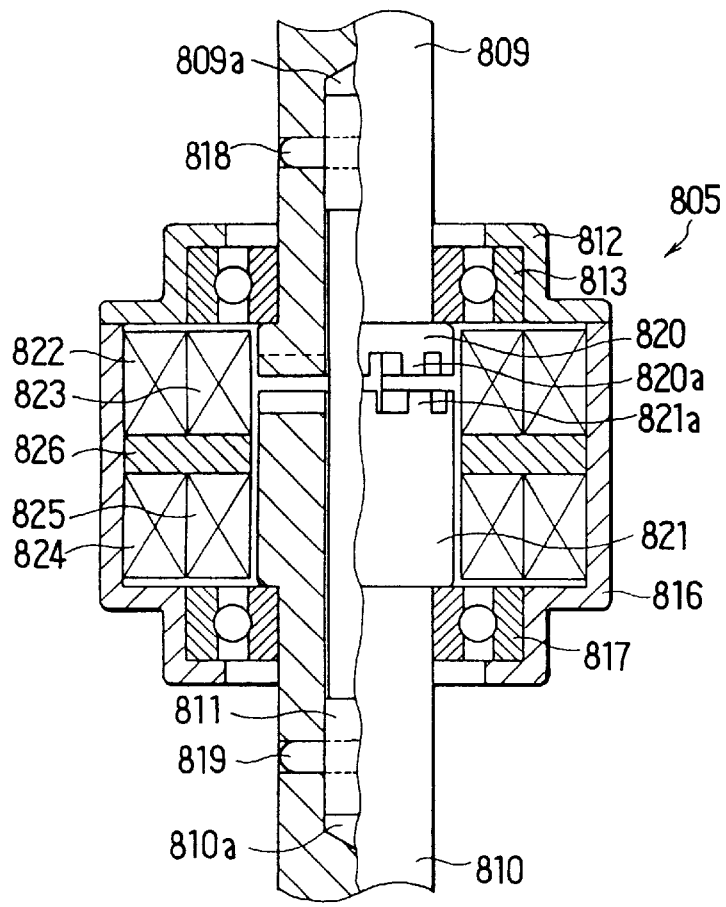
FIG. 17 is a sectional view of a torque sensor used in the fourth embodiment.

In the fourth embodiment shown in FIGS. 15, 16 and 17, a power steering device 801, is constituted by a steering shaft 804 for transmitting the steering force of a steering wheel 802 to a vehicle wheel side rack shaft 803, a torque sensor 805 disposed on the steering shaft 804, an electric motor 806 which is a power source of the steering assistance force applied to the rack shaft 803, a switching unit 807 for switching a unidirectional rotation output of the electric motor 6 to the rotation in normal and reverse directions and transmitting it, an output shaft 808 for transmitting the rotation transmitted via the switching unit 807 to the rack shaft 803 and the like.

The steering shaft 804 is constituted by a stub shaft 809 and a pinion shaft 810 which are disposed opposite to each other on the same axis and a torsion bar 11 (FIG. 17) for coupling the stub shaft 809 to the pinion shaft 810.

The stub shaft 809 has one end thereof coupled to the steering wheel 802 and has the other end thereof rotatably supported by a bearing 813 (FIG. 17) fixed to a cover 812 of the torque sensor 805.

The pinion shaft 810 has a pinion gear 814 on one end thereof, wherein the pinion gear 814 is engaged with and coupled to a rack gear 815 formed on the rack shaft 803, and has the other end thereof rotatably supported by a bearing 817 (see FIG. 17) fixed to a casing 816 of the torque sensor 805.

The torsion bar 811, as shown in FIG. 17, is inserted into a hollow portion 809a formed in one end of the stub shaft 809 and a hollow portion 810a formed in the other end of the pinion shaft 810 and is prevented from rotating relative to the shafts 809, 810 by pins 818, 819.

The torque sensor 805 detects by voltage the force with which a driver steers the steering wheel 802 (steering force) and the direction of torsion of the steering shaft 804 and is a well-known non-contact type sensor. As shown in FIG. 17, the torque sensor 805 is provided with cylindrical portions 820 and 821 which are disposed at the other ends of the stub shaft 809 and the pinion shaft 810 and are made of magnetic material, an exciting coil 822 and a detecting coil 823 which are disposed on the outer peripheries of opposite portions where both cylindrical portions 820 and 821 are opposite to each other in the axial direction to detect a change in magnetism, and an exciting coil 824 and a detecting coil 825 which are disposed on the outer periphery of the cylindrical portion 821 of the pinion shaft 810 for a temperature compensation. In this construction, a plate 826 made of nonmagnetic material is interposed between the coils 822 and 823 for detecting a change in magnetism and the coils 824 and 825 for temperature compensation to separate the coils 822 and 823 for detecting a change in magnetism from the coils 824 and 825 so that those form different magnetic circuits.

On the opposite portions of the cylindrical portions 820 and 821 are formed projected and recessed portions 820a and 821*a* which are opposite to each other in the axial direction. The exciting coil 822 and the detecting coil 823 for detecting a change in magnetism and exciting coil 824 and the detecting coil 825 for the temperature compensation are fixed in the casing 816 such that those axes are the same as those of the shafts 809 and 810.

An alternating voltage is applied to the exciting coils 822 and 824 to generate an induced voltage in the magnetic circuit of the coil 823 for detecting a change in magnetism which passes the projected and recessed portions 820*a* and 821*a* of the cylindrical portions 820 and 821 and in the magnetic circuit of the coil 825 which passes the cylindrical portion 821 of the pinion shaft 810, respectively.

The torque sensor 5 operates as follows. If a driver turns the steering wheel 802, the torsion bar 811 which couples the stub shaft 809 to the pinion shaft 810 is elastically deformed to generate a relative torsion between the stub shaft 809 and the pinion shaft 810, whereby a change in magnetic resistance is produced in the projected and recessed portions 820*a* and 821*a* formed on the cylindrical portions 820 and 821 of the stub shaft 809 and the pinion shaft 810, which changes the induced voltage generated in the detecting coil 823 for detecting a change in magnetism. Since a change in magnetic resistance is not produced in the detecting coil 825, the induced voltage generated in the detecting coil 825 is not changed. However, since a change in resistance is produced in each of coils 822 to 825 by a change in temperature, if a difference between a change in the induced voltage of the detecting coil 825 for ensuring the temperature and a change in the induced voltage of the detecting coil 823 for detecting a change in magnetism is detected, a change in steering force according to the relative torsion between the stub shaft 809 and the pinion shaft 810 and the direction of torsion of the torsion bar 811 can be detected by the voltage, irrespective of a change in temperature.

The electric motor 806, as shown in FIG. 16, is a well-known direct current motor which is constituted by a cylindrical yoke 827, a plurality of permanent magnets 828 fixed on the inner peripheral surface of the yoke 827, an armature disposed in the inner peripheral sides of the permanent magnets 828, a brush unit (not shown) for supplying electricity to the armature and the like.

The armature is provided with an armature core 829 constituted by a plurality of laminated thin steel sheets, an armature coil 830 wound on the armature core 829, and an armature shaft 831 for supporting the armature core 829 and one end of the armature shaft 831 is rotatably supported by a bearing 833 fixed to the center case 832 of the switching unit 807 and the other end thereof is rotatably supported by a bearing (not shown). The armature shaft 831 has a driving bevel gear 834 for transmitting rotation produced by the electric motor 806 mounted to one end thereof armature shaft 831 and has a commutator (not shown) electrically mechanically coupled to the armature coil 830 disposed on the outer periphery of the other end thereof.

In this respect, the electric motor 806 is rotated in one direction. It is assumed in this embodiment that the armature shaft 831 is rotated clockwise when viewed from the bottom side in FIG. 16.

The switching unit 807, as shown in FIG. 16, is constituted by a first rotating member 835 and a second rotating member 836 to which the rotation of the electric motor 806 is transmitted and which are rotated in opposite directions each other, a movable member 837 which can be moved in the right and left directions in FIG. 1 on the output shaft 808, a first clutch 838 interposed between the movable member 837 and the first rotating member 835, a second clutch 839 interposed between the movable member 837 and the second rotating member 836, an electromagnetic solenoid 841 for moving the movable member 837 in the axial direction via a lever 840 and the like.

The output shaft 808 is provided with a pinion gear 842 on the other end, wherein the pinion gear 842 is engaged with and coupled to the rack gear 843 of the rack shaft 803 (FIG. 15), and is rotatably supported by a bearing 844 fixed to the center case 832 of the switching unit 807 and a bearing 846 fixed to the cover 845 fitted in the center case 832 and the thrust of the output shaft 808 in the axial direction is regulated by a washer 847. In this respect, the output shaft 808, as shown in FIG. 16, intersects the armature shaft 831 of the electric motor 6 at right angles.

The first rotating member 835 and the second rotating member 836 are disposed opposite to each other in the axial direction (in the right and left directions in FIG. 16) on the outer periphery of the output shaft 808 and are rotatably supported by the bearings 848 and 849 disposed on the output shaft 808 and the thrust thereof in the axial direction is regulated by the washers 850 and 851. Moreover, the first rotating member 835 and the second rotating member 836 are respectively provided with driven bevel gears 852 and 853 on the end portions of the outer peripheries thereof and the driven bevel gears 852 and 853 are engaged with the driving bevel gear 834 mounted on the armature shaft 831 to transmit the rotation of the armature. However, if the armature is rotated clockwise, the first rotating member 835 is rotated clockwise when viewed from the left side in FIG. 16 and the second rotating member 836 is rotated counterclockwise (clockwise when viewed from the right side in FIG. 16).

The movable member 837 is disposed such that it is engaged with a helical spline 854 formed on the outer periphery of the output shaft 808 between the first rotating member 835 and the second rotating member 836 and can be moved along the helical spline 854 on the output shaft 808. The movable member 837 is pressed in the right direction in FIG. 16 by a spring 855 interposed between the movable member 837 and the bearing 848 supporting the first rotating member 835 via a washer, and at the same time, is pressed in the left direction in FIG. 16 by a spring 856 interposed between the movable member 837 and the bearing 849 supporting the second rotating member 836 via a washer. In this respect, almost same load (pressing force) is applied to both springs 855 and 856 such that the movable member 837 can be stopped nearly in the center of the first rotating member 835 and the second rotating member 836.

The first clutch 838 is constituted by friction pads 857 and 858 which are disposed in the opposite portions of the first rotating member 835 and the movable member 837 and the second clutch 839 is constituted by friction pads 859 and 860 which are disposed in the opposite portions of the second rotating member 836 and the movable member 837. When the switching unit 807 is not operated, the movable member 837 is pressed equally from both sides in the axial direction by the springs 855 and 856 to release the first clutch 838 and the second clutch 839 (that is, the friction pads 857 and 858 and the friction pads 859 and 860 are separated from each other, respectively).

The magnetic solenoid 841, as shown in FIG. 16, is constituted by a solenoid yoke 861 and a solenoid cover 862 which form a magnetic frame, a first coil 863 and a second coil 864 which are disposed opposite to each other in the magnetic frame, a plunger 865 which can be moved in the hollow space between both coils 863 and 864 and the like and is adjacent to the switching unit 807. If an electric current is passed through the first coil 863 or the second coil 864, the magnetic solenoid 841 receives a magnetic force generated in the first coil 863 or the second coil 864 through which the electric current is passed to move the plunger 865 to the side of the first coil 863 or the second coil 864 through which the electric current is passed. The movement of the plunger 865 is transmitted to the movable member 837 via the lever 840 to move the movable member 37 in the axial direction. In this respect, the first coil 863 and the second coil 864 are supplied with the electric current and controlled by an electronic control unit (ECU, not shown) based on the voltage signal of the torque sensor 805

The lever 840 is passed through an elongated hole 832a made in the center case 832 and an elongated hole 861a made in the solenoid yoke 861 and is disposed in the center case 832 and the solenoid yoke 861, and has one end thereof coupled to the center portion of the plunger 865 and has the other end thereof coupled to the recessed portion of the movable member 837, and is supported by a supporting pin 866 fixed to the center case 832.

In the fourth embodiment, if the driver rotates the steering wheel 802 in the direction which rotates the output shaft 808 clockwise when viewed from the left side in FIG. 16, a voltage signal corresponding to the torsional direction of the torsion bar 811 is detected by the torque sensor 805 and an electric current is passed through the first coil 863 of the electromagnetic solenoid 841 by the command from the ECU based on the voltage signal. Therefore, the plunger 865 is attracted to the right side in FIG. 16 by the magnetic force generated in the first coil 863 and this movement of the plunger 865 makes the lever 840 press the movable member 837 to the left side in FIG. 16 with a supporting pin 866 as a fulcrum and compress the spring 855, whereby both friction pads 857 and 858 for constitution the first clutch 838 are put into contact with each other.

On the other hand, a voltage signal corresponding to the steering force of the steering wheel 802 is detected by the torque sensor 805 and an electric current is passed through the electric motor 806 by the command of the ECU based on the voltage signal. If the armature is rotated in one direction (clockwise when viewed from the bottom side in FIG. 16), the rotation of the armature is transmitted to the first rotating member 835 and the second rotating member 836 via the driven bevel gears 852 and 853 which are engaged with the driving bevel gear 834, whereby the first rotating member 835 is rotated clockwise when viewed from the left side in FIG. 16 and the second rotating member 836 is rotated counterclockwise when viewed from the left side in FIG. 16. Since the friction pad 857 of the first rotating member 835 is in contact with the friction pad 858 fixed on the movable member 837, the rotation of the first rotating member 835 is transmitted to the movable body 837 via the first clutch 838. Since the movable member 837 is engaged with the helical spline 854 of the output shaft 808, the movable member 837 is rotated in the same direction as the first rotating body 835 (clockwise direction), and at the same time, starts to move to the left side in FIG. 16 on the output shaft 808 along the helical spline 854. The further movement of the movable member 837 in the axial direction continues to press the friction pads 857 and 858 until the reaction force of the rack shaft 803 balances with the torque of the first rotating member 835.

In this regard, conditions for engaging the first clutch 838 by using the output torque generated by the electric motor 806 itself will be described below. It is assumed that the torque of the first rotating member 835 transmitted by the electric motor is T, the mean contact diameter of both friction pads 857 and 858 for constituting the first clutch 838 is R, the coefficient of friction between the friction pads 857 and 858 is $\mu 1$, the radius of engagement of the helical spline 854 formed on the output shaft 808 with the movable member 837 is r, the coefficient of friction between the helical spline 854 formed on the output shaft 808 and the movable member 837 is $\mu 2$, and the angle of torsion of the helical spline 854 formed on the output shaft 808 is $\theta$.

The pressing force F of the movable member 837 against both friction pads 857 and 858 is expressed by the equation, $$F=(\tan\theta-\mu 2)\cdot T/r,$$

and the torque which can be transmitted by the first clutch 838 is expressed by the equation, $$t=\mu 1\cdot F\cdot R$$

$$=\mu 1\cdot R\cdot(\tan\theta-\mu 2)\cdot T/r$$

To engage both friction pads 857 and 858 by using the output torque T generated by the electric motor 806 itself, the following relationship is required to be satisfied:

the torque T of the first rotating member 35 is not more than the torque t which can be transmitted by the first clutch 38, that is, $$T\leq\mu 1\cdot R\cdot(\tan\theta-\mu 2)\cdot T/r$$

From this equation, the following relation is obtained:

$$r\leq 1\cdot R\cdot(\tan\theta-\mu 2)$$

In the present preferred embodiment, if r=10 mm, R=22 mm, $\theta$=50 deg., $\mu 1$=0.5, and $\mu 2$=0.1, the above relation is satisfied.

As a result, if the coefficient of friction is produced between both pads 857 and 858 for constituting the first clutch 838 by the attraction force of the electromagnetic solenoid 841, that is, if both pads 857 and 858 are in contact with each other, the first clutch 838 can be engaged by using the output torque generated by the electric motor 806 itself. Further, the second clutch 839 is also designed with the same specifications as the first clutch 838.

If the reaction force of the rack shaft 803 balances with the torque of the first rotating member 835, the output torque of the electric motor 806 is transmitted to the output shaft 808 via the first rotating member 835 and the movable member 837 coupled to the first rotating member 835 by the first clutch 838, whereby the steering assistance force is applied to the output shaft 808 clockwise.

If the driver further increases the steering force of the steering wheel 802, an electric current passed through the electric motor 806 is increased by the voltage signal based on the steering force from the torque sensor 805 to increase the output of the electric motor 806. If the output of the electric motor 806 is increased, the torque of the first rotating member 835 is increased and the movable member 837 starts to be moved further to the left side in FIG. 16 to increase the engaging force of the first clutch 838 (pressing force between both friction pads 857 and 858). The further movement of the movable member 837 continues to press both friction pads 857 and 858 until the reaction force of the rack shaft 803 balances with the torque of the first rotating member 835. When the reaction force of the rack shaft 803 balances with the torque of the first rotating member 835, the output torque of the electric motor 806 is transmitted to the output shaft 808 via the first rotating member 835 and the movable member 837 which are coupled by the first clutch

838, whereby the steering assistance force is further applied to the output shaft 808 clockwise.

Then, if the driver stops operating the steering wheel 802 to release the steering force, the electric current supplied to the electric motor 806 is shut off by the voltage signal based on the release of steering force from the torque sensor 805 to stop the output of the electric motor 806. Since the output of the electric motor 806 is stopped and hence the torque of the first rotating member 835 is eliminated, the pressing force for moving the movable member 837 to the left side in FIG. 16 via the helical spline 854 is also eliminated. Further, since the voltage signal based on the torsional direction from the torque sensor 805 is eliminated by the release of the steering force, the electric current supplied to the first coil 863 is shut off to eliminate the magnetic force. As a result, since the attraction force of the electromagnetic solenoid 841 for attracting the plunger 865, that is, the pressing force for moving the movable member 837 to the left side in FIG. 16 is eliminated, the movable member 837 is pressed back to the right side in FIG. 16 by the reaction force of the spring 855 to release the first clutch 838.

In this respect, if the driver rotates the steering wheel 802 in the direction which rotates the output shaft 808 counterclockwise, when viewed from the left side in FIG. 16, an electric current is passed through the second coil 864 by the command of the ECU based on the voltage signal of the torque sensor 805 to engage the second clutch 839, whereby the output torque of the electric motor 806 is transmitted to the output shaft 808 via the second rotating member 836 and the movable member 837 to apply the counterclockwise steering assistance force to the output shaft 808. This operation is the same as is the case where the output shaft 808 is turned clockwise, as described above.

In the fourth embodiment, the steering assistance force applied to the output shaft 808 is not proportional to the steering force of the driver and, even if the steering force of the driver is constant, the electric motor 806 can increase the pressing force of the clutch mechanism (the first clutch 838 or the second clutch 839) by the driving force of itself such that the pressing force of the clutch mechanism balances with the reaction force of the rack shaft 803, whereby the steering assistance force can be increased without increasing the steering force by the driver. That is, since it is not necessary to directly use the steering force of the driver so as to obtain the engaging force of the clutch mechanism as in the case of the conventional device, the steering force of the driver may be small. Moreover, since the electromagnetic clutch is not required to produce all the engaging force of the clutch mechanism, the present embodiment can reduce electricity consumption and hence be effective and the engaging force of the electromagnetic clutch can be obtained by the output generated by the electric motor itself and hence, even if the clutch mechanism is made compact, it can transmit large output.

(Fifth Embodiment)

Figure 18:
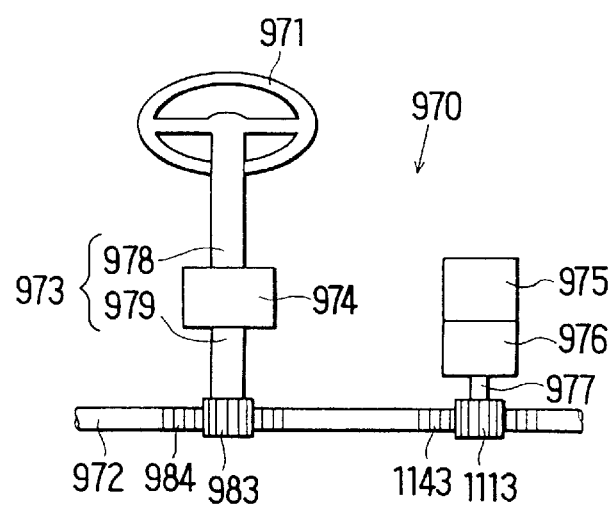
FIG. 18 is a schematic view showing a power steering device according to a fifth embodiment of the present invention.

In the fifth embodiment shown in FIGS. 18 to 21, a power steering device 970 is constituted, as shown in FIG. 18, by a steering shaft 973 for transmitting the steering force of a steering wheel 971 to a vehicle wheel side rack shaft 972, a torque sensor 974 mounted on the steering shaft 973, an electric motor 975 of the power source of the steering assistance force applied to the rack shaft 972, a switching unit 976 for switching a unidirectional rotation output by the electric motor 975 to the rotation in normal and reverse directions and transmitting the rotation, an output shaft 977 for transmitting the rotation transmitted via the switching unit 976 to the rack shaft 972 and the like.

The steering shaft 973 is constituted by a stub shaft 978 and a pinion shaft 979 which are disposed opposite to each other on the same axis and a torsion bar 980 (FIG. 20) for coupling the stub shaft 978 to the pinion shaft 979.

The stub shaft 978 has one end thereof coupled to the steering wheel 971 and has the other end thereof rotatably supported by a bearing 982 (FIG. 20) fixed to the sensor case 981 of the torque sensor 974.

The pinion shaft 979 has a pinion gear 983 on one end thereof, wherein the pinion gear 983 is engaged with and coupled to a rack gear 984 formed on the rack shaft 972, and has the other end thereof rotatably supported by a bearing 985 (FIG. 20) fixed to the sensor case 981 of the torque sensor 974.

Figure 20:
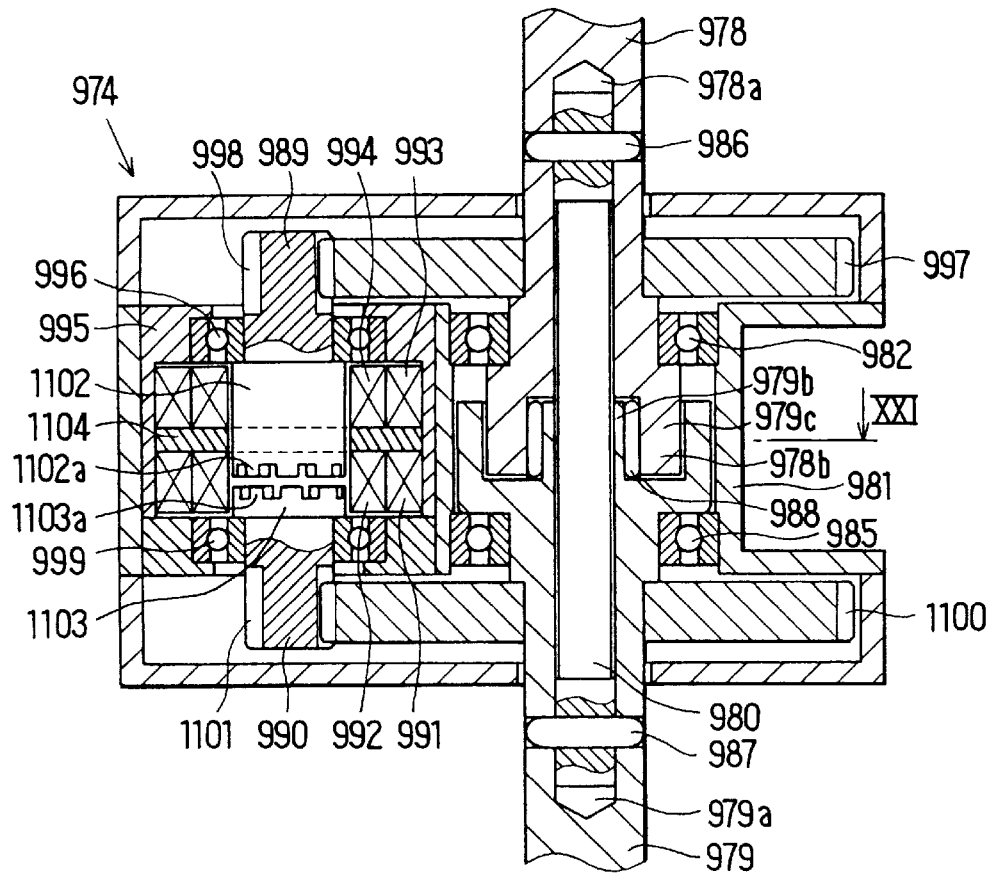
FIG. 20 is a sectional view of a torque sensor used in the fifth embodiment.

A torsion bar 980, as shown in FIG. 20 is inserted into a hollow portion 978a formed in the other end of the stub shaft 978 and a hollow portion 979a formed in one end of the pinion shaft 979 and is prevented from rotating relative to the shafts 978, 979 by pins 986 and 987.

Figure 21:
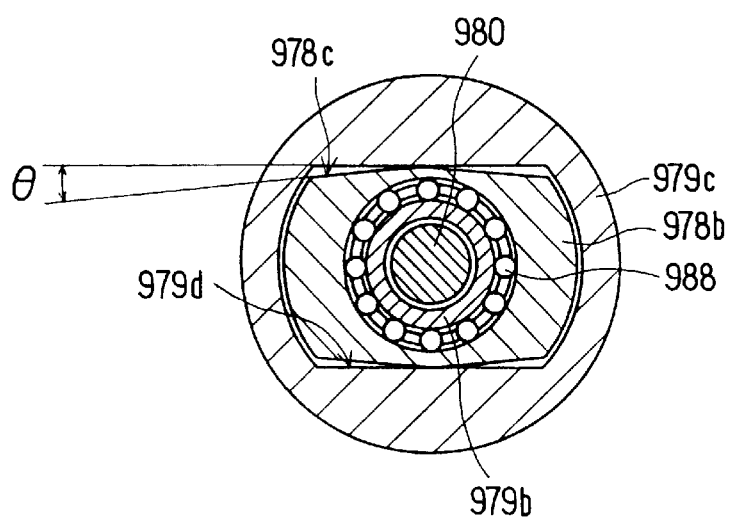
FIG. 21 is a sectional view taken along a line XXI—XXI in FIG. 20.

On the opposite portions (end portions) of the stub shaft 978 and the pinion shaft 979, a needle bearing 988 is interposed between the inner face of the cylindrical portion made in the stub shaft 978 and the outer face of the cylindrical portion 979b made in the pinion shaft 979 to improve the degree of coaxiality of the shafts 978 and 979. Moreover, a mechanical stopper for regulating the torsion angle of the torsion bar 980 is constituted by the cylindrical portion 978b made on the stub shaft 978 and the outside cylindrical portion 979c made on the pinion shaft 979. This mechanical stopper has a well-known structure and, as shown in FIG. 21, has the cylindrical portion 978b of the stub shaft 978 fitted in the inner periphery of the outside cylindrical portion 979c of the pinion shaft 979 and has a gap of an angle θ between a parallel plane 979d made on the inner periphery of the outside cylindrical portion 979c and a slant plane 978c made on the outer periphery of the cylindrical portion 78b. Thus, if the driver rotates the steering wheel 971 to produce a torsion on the torsion bar 980 and the torsion angle becomes as described above, a gap between the parallel plane 979d of the outside cylindrical portion 979c and the slant plane 978c of the cylindrical portion 978b is eliminated to put the parallel plane 979d into contact with the slant plane 978c, whereby the torsion bar 980 is not twisted further over the angle and ensures durability in torsion for the torsion bar 980.

The torque sensor 974 detects by voltage the force with which a driver steers the steering wheel 971 (steering force) and the direction of torsion of the steering shaft 973 and is a well-known non-contact type sensor. As shown in FIG. 20, the torque sensor 974 is constituted by a rotating sensor shaft 989 to which the rotation of the stub shaft 978 is transmitted and which is rotated, a rotating sensor shaft 990 to which the rotation of the pinion shaft 979 is transmitted and which is rotated, an exciting coil 991 and a detecting coil 992 for detecting a change in magnetism, an exciting coil 993 and a detecting coil 994 for a temperature compensation, and the like.

The sensor shaft 989 is disposed in parallel to the stub shaft 978 and is rotatably supported by a bearing 996 disposed in a coil case 995 fitted in the sensor case 981 and a spur wheel 998 which is engaged with a spur wheel 997 fixed on the stub shaft 978 and increases the rotational speed of the stub shaft 978 is formed on the axis of the sensor shaft 989.

The sensor shaft 990 is disposed in parallel to the pinion shaft 979 and is disposed opposite to the sensor shaft 989 and is rotatably supported by a bearing 999 fixed to the coil case 995 and a spur wheel 1101 which is engaged with a spur wheel 1100 fixed on the stub shaft 978 to increase the rotational speed of the pinion shaft 979 is formed on the axis of the sensor shaft 990.

Cylindrical portions 1102 and 1103 made of magnetic material are disposed on both end portions of the sensor shaft 989 and sensor shaft 990, and projected and recessed portions 1102a and 1103a which are opposite to each other in the axial direction are formed on the opposite portions of the cylindrical portions 1102 and 1103.

The coils 991 and 992 for detecting a change in magnetism are disposed on the outer peripheries of the opposite portions of both cylindrical portions 1102 and 1103 which are opposite to each other in the axial direction and are fixed in the coil case 995 such that those axes are the same as those if the sensor shafts 989 and 990. The coils 993 and 994 are disposed on the outer periphery of the cylindrical portion 1102 and are fixed in the coil case 995 such that those axes are the same as those of the sensor shafts 989 and 990. Further, a plate 1104 made of nonmagnetic material is interposed between the coils 991 and 992 for detecting a change in magnetism and the coils 993 and 994 to separate the coils 991 and 992 for detecting a change in magnetism from the coils 993 and 994 so that those form different magnetic circuits.

An alternating current voltage is applied on the exciting coils 991 and 993 to generate an induced voltage in the magnetic circuit of the coil 992 for detecting a change in magnetism which passes the projected and recessed portions 1102a and 1103a of the cylindrical portions 1102 and 1103 and in the magnetic circuit of the coil 994 which passes the cylindrical portion 1102, respectively. In this respect, the operation of the torque sensor 974 is the same as that of the fourth embodiment.

Figure 19:
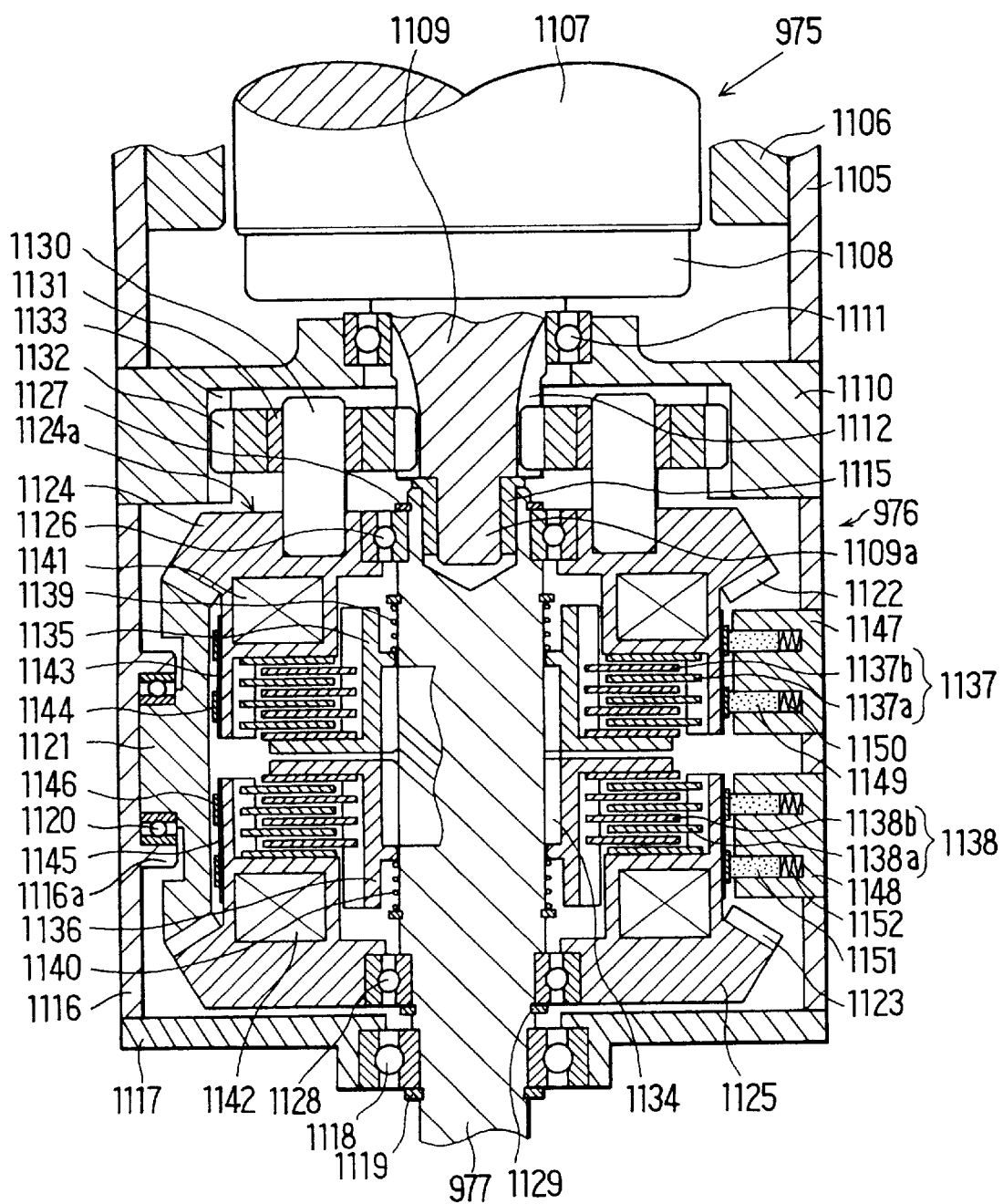
FIG. 19 is a sectional view of a switching unit used in the fifth embodiment.

The electric motor 975, as shown in FIG. 19, is a well-known direct current motor which is constituted by a cylindrical yoke 1105, a plurality of permanent magnets 1106 fixed on the inner peripheral surface of the yoke 1105, an armature disposed in the inner peripheral side of the permanent magnets 1106, a brush unit (not shown) for supplying electricity to the armature and the like.

The armature is provided with an armature core 1107 constituted by a plurality of laminated thin steel sheets, an armature coil 1108 wound on the armature core 1107, and an armature shaft 1109 for supporting the armature core 1107 and one end of the armature shaft 1109 is rotatably supported by a bearing 1111 fixed to the center case 1110 of the switching unit 976 and the other end thereof is rotatably supported by a bearing (not shown). A driving sun gear 1112 for transmitting a rotation produced by the electric motor 975 is formed on one end side of the armature shaft 1109 and a portion 1109a with a small diameter is made on the tip end side (bottom side in FIG. 19) below driving sun gear 1112 of the armature shaft 1109. Further, the commutator (not shown) which is electrically mechanically coupled to the armature coil 1108 is disposed on the outer periphery of the other end of the armature shaft 1109.

In this respect, this electric motor 975 is rotated in one direction. It is assumed that the armature shaft 1109 is rotated clockwise when viewed from the bottom side in FIG. 19.

Next, the structure of the switching unit 976 for switching the rotational direction of the electric motor 975 according to the rotational direction of the stub shaft 978 will be described with reference to FIG. 19.

The output shaft 977 for transmitting the rotation of the electric motor 975 to the rack shaft 972 is disposed on the same axis as the armature shaft 1109 of the electric motor 975 and a pinion gear 1113 provided on the other end side of the output shaft 977 is engaged with and coupled to the rack gear 1114 of the rack shaft 972 (FIG. 18). This output shaft 977 has a bearing 1115 disposed inside the cylindrical recessed portion made in one end thereof and is rotatably supported by the portion 1109a with a small diameter of the armature shaft 1109 via this bearing 1115 and by a bearing 1118 fixed on a cover 1117 fitted in a clutch case 1116 and the thrust thereof in the axial direction is regulated by a washer 1119.

On the inner periphery of the clutch case 1116 is disposed an idle bevel gear 1121 which is rotatably supported by a bearing 1120 housed in a bearing holding portion 1116a of the clutch case 1116.

A first rotating member 1124 having a bevel gear 1122 and a second rotating member 1125 having a bevel gear 1123 which are engaged with the idle bevel gear 1121 and are opposite to each other in the axial direction of the output shaft 977 are disposed on the output shaft 977. The first rotating member 1124 is rotatably supported on the output shaft 977 by a bearing 1126 and the thrust thereof is regulated by a washer 1127. Similarly, the second rotating body 1125 is also rotatably supported on the output shaft 977 by a bearing 1128 and the thrust thereof is regulated by a washer 1129.

The first rotating member 1124 has a plurality of pins 1130 fixed on the side portion thereof 1124a. The pins 1130 are disposed at equal intervals in the circumferential direction of the side portion 1124a and are protruded in parallel to the output shaft 977 toward the electric motor 975 side (top side in FIG. 19). A planetary gear 1132 is rotatably supported on the outer periphery of the pin 1130 via a bearing 1131. The planetary gear 1132 is engaged with a driving sun gear 1112 formed on the armature shaft 1109 and is also engaged with an internal gear 1133 (internal teeth) formed on the inner periphery of the center case 1110. Therefore, a planetary gear type speed reduction mechanism is interposed between the electric motor 975 and the first rotating member 1124 and hence the rotation of the armature is reduced by the planetary gear type speed reduction mechanism and is transmitted to the first rotating member 1124. In this respect, the first rotating member 1124 is rotated clockwise when viewed from the bottom side in FIG. 19 because the armature is rotated clockwise and the second rotating member 1125 is rotated counterclockwise via the idle bevel gear 1121 when viewed from the bottom side in FIG. 19.

A helical spline 1134 is formed on the outer periphery of the output shaft 977 between the first rotating member 1124 and the second rotating member 1125. A first movable member 1135 and a second movable member 1136 are disposed such that those are engaged with the helical spline 1134 and can be moved on the output shaft 977 along the helical spline 1134, respectively. The first movable member 1135 and the second movable member 1136 are disposed opposite to the first rotating member 1124 and the second rotating member 1125, respectively. A first clutch 1137 is disposed between the opposite portions of first movable member 1135 and the first rotating member 1124 and a second clutch 1138 is disposed between the opposite portions of second movable member 1136 and the second rotating member 1125.

The first clutch 1137 is constituted by a plurality of friction plates 1137a which are straight spline-coupled to the first rotating member 1124 and a plurality of friction plates 1137b which are straight spline-coupled to the first movable member 1135, wherein the friction plates 1137*a* and the friction plates 1137*b* are alternately disposed. If the friction plates 1137*a* are put into contact with the friction plates 1137*b* and are coupled to the friction plates 1137*b* by friction, the first rotating member 1124 can be coupled to the first movable member 1135 and, if the friction plates 1137*a* are separated from the friction plates 1137*b*, the first rotating member 1124 can be separated from the first movable member 1135.

The second clutch 1138 is constituted by a plurality of friction plates 1138*a* which are straight spline-coupled to the second rotating member 1125 and a plurality of friction plates 1138*b* which are straight spline-coupled to the second movable member 1136, wherein the friction plates 1138*a* and the friction plates 1138*b* are alternately disposed. If the friction plates 1138*a* are put into contact with the friction plates 1138*b* and are coupled to the friction plates 1138*b* by friction, the second rotating member 1125 can be coupled to the second movable member 1136 and, if the friction plates 1138*a* are separated from the friction plates 1138*b*, the second rotating member 1125 can be separated from the second movable member 1136.

Further, the first movable member 935 is pressed downward in FIG. 19 by a spring 1139 regulated by a washer in regard to the output shaft 977 and is prevented from moving down by the end face of the helical spline 1134. The second movable member 1136 is also pressed upward in FIG. 19 by a spring 1140 regulated by a washer relative to the output shaft 977 and is prevented from moving up by the end face of the helical spline 1134. Thus, when the switching unit 976 is not operated, the friction plates 1137*a* and 1137*b* for constituting the first clutch 1137 and the friction plates 1138*a* and 1138*b* for constituting the second clutch 1138 are released and hence the first clutch 1137 and the second clutch 1138 are released.

A first coil 1141 and a second coil 1142 which constitute electromagnetic solenoids respectively are disposed in the first rotating member 1124 and the second rotating member 1125. A ring 1144 which is made of a conductive material and supplies an electric current to the first coil 1141 via an annular insulator 1143 is disposed on the outer periphery of the first rotating member 1124 and a ring 1146 which is made of a conductive material and supplies an electric current to the second coil 1142 via an annular insulator 1145 is disposed on the outer periphery of the second rotating member 1125. These rings 1144 and 1146 are electrically connected to the ends of the first coil 1141 and the second coil 1142.

Cases 1147 and 1148 made of an electrical insulating material are disposed on the outer periphery of the first rotating member 1124 and the outer periphery of the second rotating member 1125, respectively. In the case 1147 is disposed a brush 1149 which is in sliding contact with the outer periphery of the ring 1144 and a spring 1150 for pressing the brush 1149 on the ring 1144. Similarly, in the case 1148 is disposed a brush 1151 which is in sliding contact with the outer periphery of the ring 1146 and a spring 1152 for pressing the brush 1151 on the ring 1146.

In this respect, the first coil 1141 and the second coil 1142 are supplied with an electric current and are controlled by an ECU (not shown) based on the voltage signal of the torque sensor 974.

The fifth embodiment operates as follows.

If the driver rotates the steering wheel 971 and hence a voltage signal corresponding to the torsional direction of the torsion bar 980 is detected by the torque sensor 974, for example, an electric current is passed through the first coil 1141 by the command from the ECU based on the voltage signal. Thus, the first movable member 1135 is attracted to the first rotating member 1124 side (upward in FIG. 19) by the magnetic force generated in the first coil 1141 while it compresses the spring 1139 and hence the group of friction plates 1137*a* and 1137*b* are put into contact with each other to slightly engage the first clutch 1137.

On the other hand, a voltage signal corresponding to the steering force of the steering wheel 971 is detected by the torque sensor 974 and an electric current is passed through the electric motor 975 by the command of the ECU based on the voltage signal. Thus, if the armature is rotated in one direction (clockwise when viewed from the bottom side in FIG. 19), the rotation of the armature is transmitted to the first rotating member 1124 via the planetary gear type speed reduction mechanism and the rotational torque of the first rotating member 1124 is transmitted to the first movable member 1135 via the first clutch 1137. Since the first movable member 1135 is engaged with the helical spline 1134 of the output shaft 977, the first movable member 1135 is rotated in the same direction as the first rotating member 1124 (clockwise) and starts to be moved upward in FIG. 19 on the output shaft 977 along the helical spline 1134. The further movement of the first movable member 1135 in the axial direction continues to press the group of friction plates 1137*a* and 1137*b* for constituting the first clutch 1137 until the reaction force of the rack shaft 972 balances with the torque of the first rotating member 1124.

If the reaction force of the rack shaft 972 balances with the torque of the first rotating member 1124, the output torque of the electric motor 975 is transmitted to the output shaft 977 via the first rotating member 1124 and the first movable member 1135 which are coupled the first clutch 1137, whereby the steering assistance force is applied to the output shaft 977 clockwise.

Then, if the driver stops operating the steering wheel 971 to release the steering force, the electric current supplied to the electric motor 975 is shut off by the voltage signal based on the release of steering force from the torque sensor 974 to stop the output of the electric motor 975. Since the output of the electric motor 975 is stopped and hence the torque of the first rotating member 1124 is eliminated, the pressing force for moving the first movable member 1135 upward in FIG. 19 via the helical spline 1134 is also eliminated. Further, since the voltage signal based on the torsional direction from the torque sensor 974 is eliminated by the release of the steering force, the electric current supplied to the first coil 1141 is shut off to eliminated the magnetic force. As a result, the first movable member 1135 is pressed back to an original position (position shown in FIG. 19) by the reaction force of the spring 1139 to release the first clutch 1137.

Further, if an electric current is passed through the second coil 1142 by the command of the ECU, the second movable member 1136 is attracted to engage the second clutch 1138, whereby the output torque of the electric motor 975 is transmitted to the second rotating member 1125 via the first rotating member 1124 and the idle bevel gear 1121 and is transmitted further to the output shaft 977 via the second movable member 1136 coupled to the second rotating member 1125 by the second clutch 1138. As a result, the steering assistance force is applied to the output shaft 977 counterclockwise.

According to the fifth embodiment, the driver can increase the steering assistance force without increasing the steering force. Since the electromagnetic clutch is not required to produce all the engaging force of the clutch mechanism (the first clutch 1137 and the second clutch 1138), electricity consumption can be reduced. In addition, since the engaging force of the electromagnetic clutch can be obtained by the output generated by the electric motor 975 itself, even if the clutch mechanism is made compact, it can transmit large output. Further, since the output shaft 977 and the armature shaft 1109 of the electric motor 975 are disposed on the same axis and the electromagnetic solenoid is housed in the switching unit 976, the device can be considerably lightweight, compact and inexpensive.

Further, although the clutch mechanism in the fourth embodiment uses friction pads having the large coefficient of friction so as to satisfy $\mu1=0.5$ in the equation, the fifth embodiment can constitute the clutch mechanism by overlaying a plurality of plates (a group of friction plates) having the coefficient of friction of about 0.1 because of a multiple disc clutch. As a result, the clutch mechanism can be made of even considerably inexpensive plate material.

Still further, since the torque sensor 974 mechanically amplifies the relative torsion angle between the stub shaft 978 and the pinion shaft 979 and then electrically detects it, the sensor constitution parts thereof are not required to be of high accuracy and hence an inexpensive torque sensor 974 can be provided. That is, the relative torsion angle of the stub shaft 978 and the pinion shaft 979 corresponds to the play of the steering wheel 971 for the driver and the enlarged relative torsion angle on the steering shaft 973 deteriorates the cornering response of a vehicle to the rotation of the steering wheel 971. Thus, the relative torsion angle is required to be reduced to about 2 to 5 degree. Therefore, the torque sensor in the fourth embodiment is required to be constituted by the sensor constitution parts of high accuracy so as to detect little displacement and hence is more expensive than the torque sensor 974 of the fifth embodiment.

(Sixth Embodiment)

Figure 22:
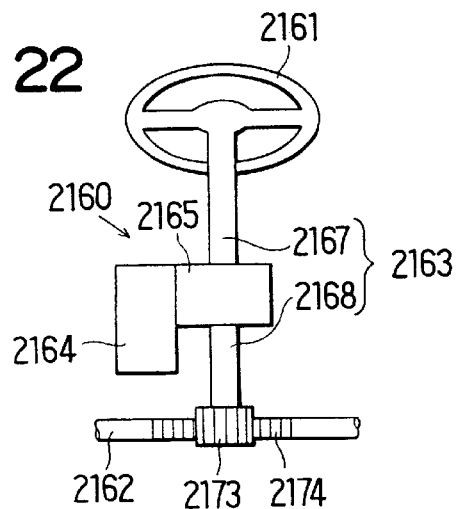
FIG. 22 is a schematic view showing a power steering device according to a sixth embodiment of the present invention.

In the sixth embodiment, as shown in FIG. 22, a power steering device 2160 is constituted by a steering shaft 2163 for transmitting the steering force of a steering wheel 2161 to a vehicle wheel side rack shaft 2162, an electric motor 2164 of a power source of the steering assistance force applied to the rack shaft 2162, a switching unit 2165 which switches a unidirectional rotation output by the electric motor 2164 to the rotation in the normal and reverse directions and transmits it, a torque sensor 2166 which is adjacent to the switching unit 2165 (FIG. 23), and the like.

The steering shaft 2163 is constituted by a stub shaft 2167 and a pinion shaft 2168 which are opposed to each other on the same axis and a torsion bar 2169 (FIG. 23) for coupling the stub shaft 2167 to the pinion shaft 2168.

Figure 23:
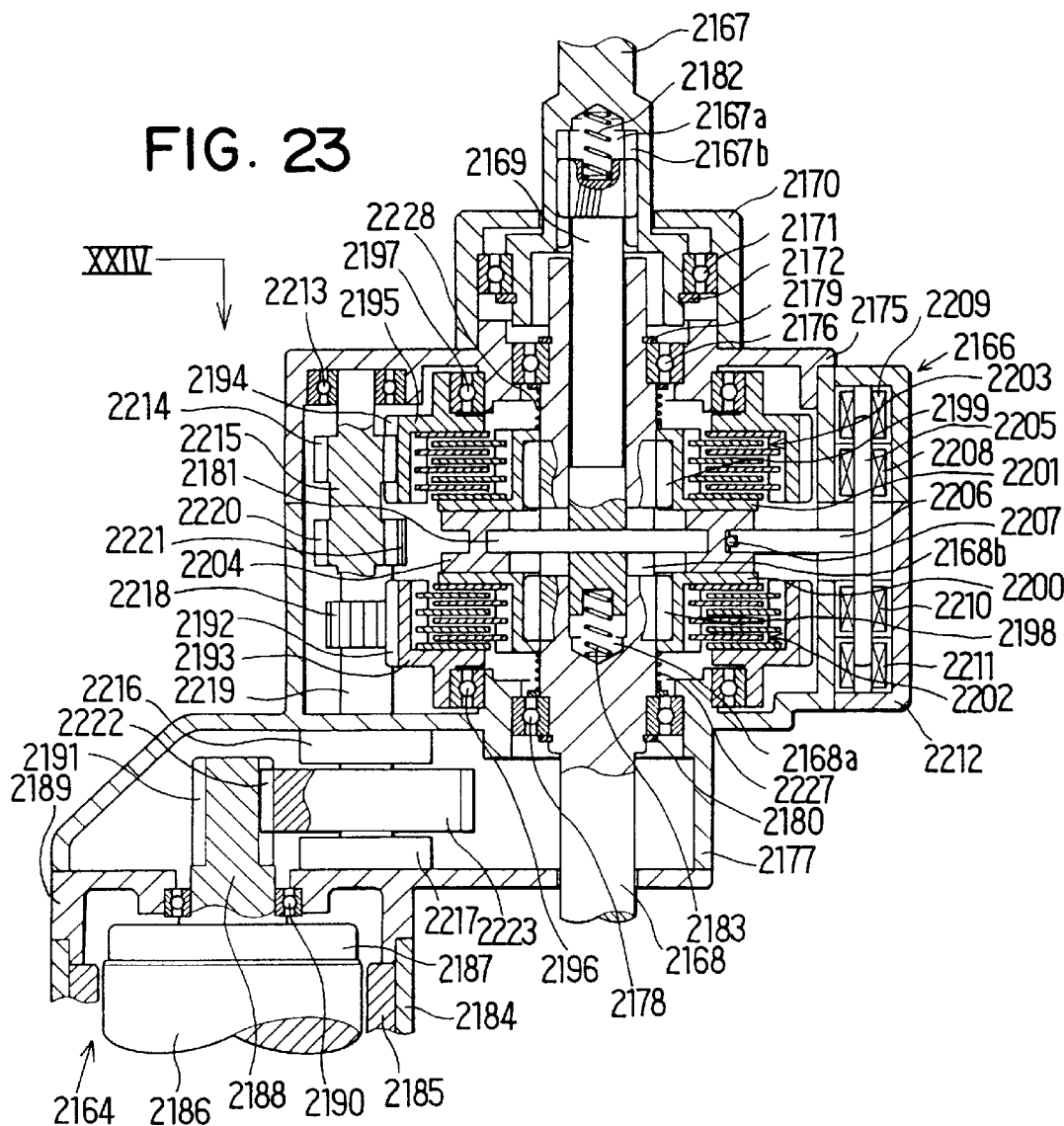
FIG. 23 is a sectional view of a switching unit used in the sixth embodiment.

The stub shaft 2167 has one end thereof coupled to the steering wheel 2161 and has the other end thereof rotatably supported a bearing 2171 fixed to the clutch cover 2170 of the switching unit 2165 and the thrust thereof in the axial direction is regulated by a washer 2172 (FIG. 23).

The pinion shaft 2168 has a pinion gear 2173 provided on the other end thereof, wherein the pinion gear 2173 is engaged with and coupled to a rack gear 2174 formed on the rack shaft 2162 (FIG. 22), and has the one end thereof rotatably supported by a bearing 2176 fixed to a clutch case 2175 and a bearing 2178 one end of which is fixed to a clutch case 2177 and the thrust thereof in the axial direction is regulated by washers 2179 and 2180 (FIG. 23). In this respect, a clutch cover 2170, the clutch cases 2175 and 2177 are fitted in each other such that the stub shaft 2167 and the pinion shaft 2168 are disposed on the same axis.

As shown in FIG. 23, one end of the torsion bar 2169 is inserted into hollow space 2167a formed in the other end side of the stub shaft 2167 and is engaged with a helical spline 2167b and the other end thereof is inserted into hollow space 2168a formed in one end of the pinion shaft 2168. This torsion bar 2169 is provided with a pin 2181 which passes through the torsion bar 2169 in a radial direction and is coupled to it and, since this pin 2181 is inserted into an elongated hole 2168b formed in the pinion shaft 2168, the torsion bar 2169 is prevented from rotating relative to the pinion shaft 2168 and is movably supported in the elongated hole 2168b in the axial direction (up-and-down directions in FIG. 23).

Further, the torsion bar 2169 is provided with recessed portions on both ends and springs 2182 and 2183 are disposed between one recessed portion and the stub shaft 2167 and between the other recessed portion and the pinion shaft 2168, respectively. Thus, the torsion bar 2169 is pressed by the springs 2182 and 2183 from both shafts 2167 and 2168 and is supported such that it is not readily moved in the axial direction even if the steering shaft 2163 vibrates.

As shown in FIG. 23, the electric motor 2164 is a well-known direct current motor which is constituted by a cylindrical yoke 2184, a plurality of permanent magnets 2185 fixed on the inner peripheral surface of the yoke 2184, an armature disposed inside the inner peripheral sides of the permanent magnets 2185, a brush unit (not shown) for supplying electricity to the armature 2702 and the like.

The armature is provided with an armature core 2186 constituted by a plurality of laminated thin steel sheets, an armature coil 2187 wound on the armature core 2186, wherein an armature shaft 2188 for supporting the armature core 2186 and one end of the armature shaft 2188 is rotatably supported by a bearing 2190 fixed to a center case 2189 and the other end thereof is rotatably supported by a bearing (not shown). An armature gear 2191 for transmitting a rotation produced by the electric motor 2164 is formed on one end side of the armature shaft 2188 and a commutator (not shown) which is electrically mechanically coupled to the armature coil 2187 is disposed on the outer periphery of the other end side of the armature shaft 2188.

In this respect, this electric motor 2164 is rotated in one direction. It is assumed that the armature shaft 2188 is rotated clockwise when viewed from the top side in FIG. 23 (from an arrow XXIV).

The switching unit 2165 is constructed as follows for switching the rotational direction of the electric motor 2164 according to the rotational direction of the stub shaft 2167.

An output shaft for transmitting the rotation of the electric motor 2164 to the rack shaft 2162 is the pinion shaft 2168 itself and hence the output shaft is integral with the pinion shaft 168.

A first rotating member 2193 having a spur wheel 2192 and a second rotating member 2195 having a spur wheel 2194 are disposed opposite to each other on the pinion shaft 2168. The first rotating member 2193 is rotatably supported by a bearing 2196 mounted in the clutch case 2177 and the second rotating member 2195 is rotatably supported by a bearing 2197 mounted in the clutch case 2175.

Helical splines 2198 and 2199 are formed on the outer periphery of the pinion shaft 2168 and a first movable member 2200 and a second movable member 2201 which are engaged with the helical splines 2198 and 2199 respectively and can move on the pinion shaft 2168 are disposed on the opposite portions of the first rotating member 2193 and the second rotating member 2195. Further, a group of plates for constituting a first clutch 2202 are disposed on the opposite portions of the first rotating member 2193 and the first movable member 2200 and a group of plates for constituting a second clutch 2203 are disposed on the second rotating member 2195 and the second movable member 2201. In this constitution, the constitution of the first clutch 2202 and the second clutch 2203 is the same as that of the fifth embodiment.

The first movable member 2200 is pressed upward in FIG. 23 via a spring 2227 retained by a washer relative to the pinion shaft 2168 and is prevented from moving upward in the axial direction by the end face of the helical spline 2198.

Similarly, the second movable member 2201 is pressed upward in FIG. 23 via a spring 2228 retained by a washer relative to the pinion shaft 2168 and is prevented from moving downward in the axial direction by the end face of the helical spline 2199. Thus, if the group of plates constituting the first clutch 2202 and the group of plates constituting the second clutch 2203 are released, the first clutch 2202 and the second clutch 2203 are released.

Further, between the opposite portions of the first movable member 2200 and the second movable member 2201 on the pinion shaft 2168, the pin 2181 passing through the torsion bar 2169 passes through the elongated hole 2168b of the pinion shaft 2168 and projects outside from the outer periphery of the pinion shaft 2168 and is engaged with a third movable member 2204 disposed between the opposite portions of the first movable member 2200 and the second movable member 2201. The third movable member 2204 is coupled to a movable iron core 2205 of the torque sensor 2166 disposed on the outer peripheries of the clutch cases 2175 and 2177 via a transmitting member 2206. The transmitting member 2206 is disposed in a recessed portion formed in the outer periphery of the third movable member 2204 via a hard ball 2207 for a bearing.

The torque sensor 2166 is a differential transformer type electromagnetic sensor and, as shown in FIG. 23, a first exciting coil 2208 and a first detecting coil 2209 for detecting a change in magnetism, and a second exciting coil 2210 and a second detecting coil 2211 for detecting a change in magnetism which are disposed on the outer periphery of the movable iron core 2205 thereof. The coils 2208 to 2211 are inserted into a coil case 2212 such that their axes are the same as that of the movable iron core 2205. Further, the coil case 2212 is fitted in and fixed to the outer peripheries of the clutch cases 2175 and 2177 such that their axes are the same. An alternating voltage is impressed on the exciting coils 2208 and 2210, respectively, to generate an induced voltage in the detecting coils 2209 and 2211, respectively. Thus, if the movable iron core 2205 is moved in the axial direction, a magnetic circuit is changed and hence the induced voltage in one of the detecting coils 2209 and 2211 is increased and the induced voltage in the other detecting coil is decreased. The extent of movement of the movable iron core 2205 can be taken out as a voltage signal by using this change in voltage.

On the outer periphery of the second rotating member 2195 is disposed a first driving shaft 2215 which is rotatably supported by a bearing 2213 disposed on the clutch case 2175 and has a spur wheel 2214 engaged with the spur wheel 2194. Further, on the outer periphery of the first rotating member 2193 is disposed a second driving shaft 2215 which is rotatably supported by bearings (not shown) which are housed in a bearing holding part 2216 disposed on the clutch case 2177 and in a bearing holding part 2217 disposed on the center case 2189 and has a spur wheel 2218 engaged with a spur wheel 2192. Still further, spur wheels 2220 and 2221 are mounted on the end portions of the first driving shaft 2215 and the second driving shaft 2219 and are engaged with each other.

On the outer periphery of the second driving shaft 2219 between the bearing holding part 2216 disposed on the clutch case 2177 and the bearing holding part 2217 disposed on the center case 2189 is disposed a clutch outer 2223 whose outer peripheral portion is provided with a spur wheel 2222 engaged with the armature gear 2191 and inner peripheral portion of which houses a one-way clutch for transmitting the rotation of the armature gear 2191 and shutting off the rotation of the second driving shaft 2219.

Figure 24:
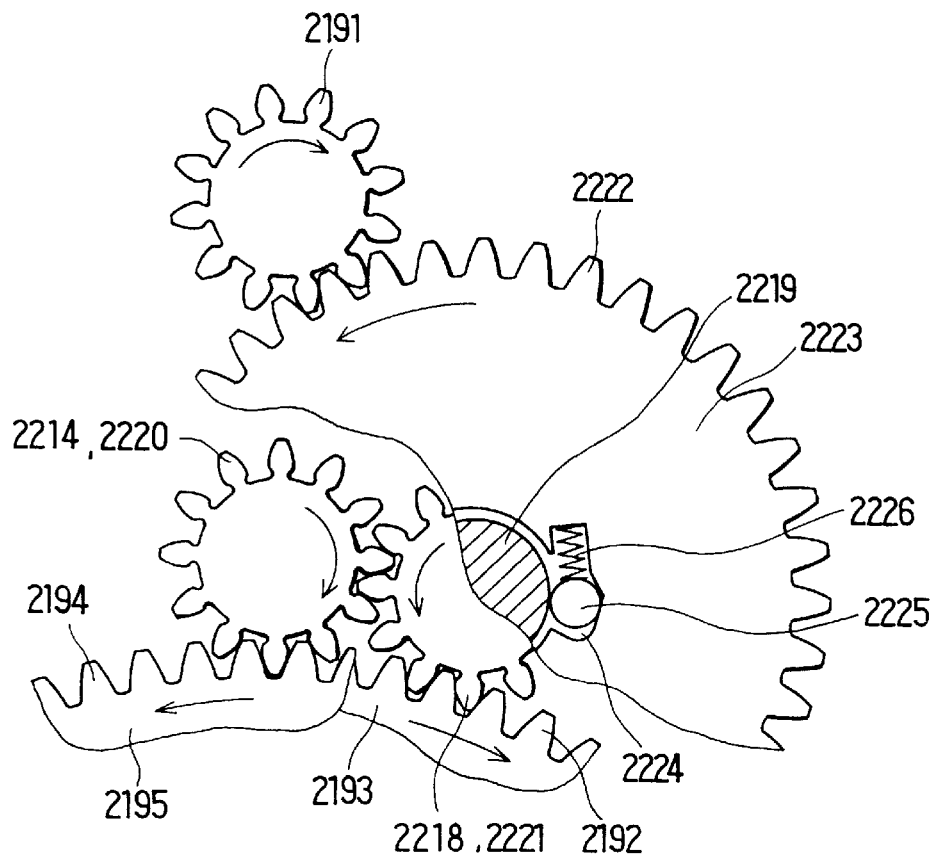
FIG. 24 is a plan view showing the positional relation of each spur wheel used in the sixth embodiment.

As shown in FIG. 24, this one-way clutch has a plurality of wedge-shaped cam rooms 2224 formed on the inner peripheral surface of the clutch outer 2223 and in each cam room 2224 is disposed a cylindrical roller 2225 and a spring 2226 for pressing this cylindrical roller 2225. If the second driving shaft 2219 is rotated counterclockwise in FIG. 24, the roller 2225 rolls on the outer peripheral surface of the second driving shaft 2219 and hence the clutch slips. On the contrary, if the clutch outer 2223 is rotated counterclockwise in FIG. 24, the roller 225 bites into the outer peripheral surface of the second driving shaft 2219 and the inner peripheral surface of the cam room 2224 and hence the clutch outer 2223 and the second driving shaft 2219 are integrally rotated to transmit rotation to each other.

The spur wheel 2218 provided on the second driving shaft 2219 is engaged with the spur wheel 2192 formed on the outer peripheral portion of the first rotating member 2193 and the spur wheel 2214 provided on the first driving shaft 2215 is engaged with the spur wheel 2194 formed on the outer peripheral portion of the second rotating member 2195. Further, the spur wheel 2221 provided on the end portion of the second driving shaft 2219 which has the same number of teeth as the spur wheel 218 and appears to overlap the spur wheel 218 in the axial direction in FIG. 24 is engaged with the spur wheel 2220 provided on the end portion of the first driving shaft 2215 which has the same number of teeth as the spur wheel 2214 and appears to overlap the spur wheel 2214 in the axial direction in FIG. 24.

Thus, if the armature gear 2191 is rotated clockwise, the spur wheel 2222 engaged with the armature gear 2191 is rotated counterclockwise and the rotation of the spur wheel 2222 is transmitted to the second driving shaft 2219 via the one-way clutch to rotate the second driving shaft 2219 counterclockwise, whereby the spur wheel 192 engaged with the spur wheel 218 provided on the second driving shaft 2219 is rotated clockwise and hence the first rotating member 2193 having the spur wheel 2192 is rotated clockwise. Further, the spur wheel 2220 engaged with the spur wheel 2221 provided on the second driving shaft 2219 is rotated clockwise and hence the first driving shaft 2215 having the spur wheel 2220 is rotated clockwise, and the spur wheel 2194 engaged with the spur wheel 2214 provided on the first driving shaft 2215 is rotated counterclockwise and hence the second rotating member 2195 having the spur wheel 2194 is rotated counterclockwise.

Next, the operation of switching the rotational direction of the electric motor 2164 according to the rotational direction of the stub shaft 2167 will be described with reference to FIG. 23.

As an example, a case in which the driver rotates the steering wheel 2161 in the direction which rotates the stub shaft 2167 clockwise when viewed from the top side in FIG. 23 will be described.

Since the torsion bar 2169 is engaged with the helical spline 2167b relative to the stub shaft 2167 and is prevented from rotating via the pin 2181 relative to the pinion shaft 2168, the torsion bar 2169 is moved on the steering shaft 2163 according to the torsion angle between the stub shaft 2167 and the pinion shaft 2168. In this embodiment, since the helical spline 2167b shown in FIG. 23 is twisted clockwise, the torsion bar 2169 is moved down in the axial direction while it compresses the spring 2183.

As the torsion bar 2169 is moved, the third movable member 2204 coupled to the torsion bar 2169 via the pin 2181 is also moved down in the axial direction to put the group of plates for constituting the first clutch 2202 into contact with each other while it compresses the spring 2227 via the first movable member 2200, whereby the first clutch 2202 is slightly engaged. Further, in the torque sensor 2166, since the movable iron core 2205 coupled to the third movable member 2204 via the hard ball 2207 and transmitting member 2206 is moved down in the axial direction to change the magnetic circuit, an induced voltage generated in the second detecting coil 2211 is increased and an induced voltage generated in the first detecting coil 2209 is decreased. This change in voltage is proportional to the extent of movement of the torsion bar 2169 and is also proportional to torsional torque between the stub shaft 2167 for moving the torsion bar while it compresses the spring 2183 and the pinion shaft 2168, that is, the steering force of the driver.

If an electric current is passed through the electric motor 2164 by the command of the ECU based on the voltage signal of the torque sensor 2166 according to the steering force of the driver, the armature is rotated clockwise and the first rotating member 2193 is rotated clockwise and the second rotating member 2195 is rotated counterclockwise.

Since the first rotating member 2193 is coupled to the first movable member 2200 via the first clutch 2202, a clockwise rotation output is transmitted by the first rotating member 2193 to the first movable member 2200. Since the first movable member 2200 is helical spline-coupled to the pinion shaft 2168, if the clockwise rotation is transmitted by the first rotating member 2193 to the first movable member 2200, the first movable member 2200 starts to be moved further down in the axial direction in FIG. 23. This further movement of the first movable member 2200 continues to press the group of plates for constituting the first clutch 2202 until the reaction force of the rack shaft 2162 balances with the torque of the first rotating member 2193. If the reaction force of the rack shaft 2162 balances with the torque of the first rotating member 2193, a clockwise steering assistance force is applied to the pinion shaft 2168.

Then, if the driver stops operating the steering wheel to release the steering force, the electric current supplied to the electric motor 2164 is shut off by the voltage signal based on the release of the steering force from the torque sensor 2166 to stop the output of the electric motor 2164. If the output of the electric motor 2164 is stopped, the torque of the first rotating member 2193 is eliminated and hence the pressing force for moving down the first movable member 2200 in the axial direction in FIG. 23 via the helical spline 2198 is eliminated. Further, since the torsion bar 2169 is pressed back upward in FIG. 23 when the steering force is released, the group of plates for constituting the first clutch 2202 are released to separate the first rotating member 2193 from the first movable member 2200.

In this respect, if the driver rotates the steering wheel 1261 in the direction which rotates the stub shaft 2167 counterclockwise when viewed from the top side in FIG. 23, the torsion bar 2169 is moved up in the axial direction to engage the second clutch 2203, whereby the second rotating member 2195 is coupled to the second movable member 2201 via the second clutch 2203 and hence the counterclockwise steering assistance force is applied to the pinion shaft 2168. This operation is the same as the case where the pinion shaft 2168 is rotated clockwise, as described above.

The sixth embodiment provides the same advantage as the fourth embodiment. In addition, it is not required to use an electromagnetic unit as moving mechanism which moves the first movable member 2200 and the second movable member 2201 for slightly engaging the first clutch 2202 and the second clutch 2203, whereas the fourth embodiment and the fifth embodiment requires it. Further, since the output shaft of the switching unit 2165 is integral with the pinion shaft 2168, the switching unit 2165 can be provided on the steering shaft 2163 and the torque sensor 2166 can be integral with the moving mechanism. As a result, a lightweight compact inexpensive electrically driven power steering device can be provided.

(Seventh Embodiment)

Figure 25:
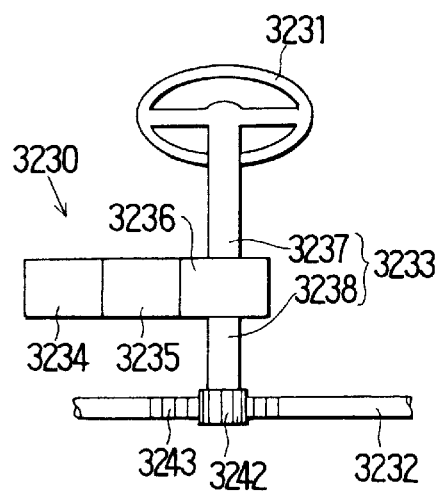
FIG. 25 is a schematic view showing a power steering device according to a seventh embodiment of the present invention.
Figure 26:
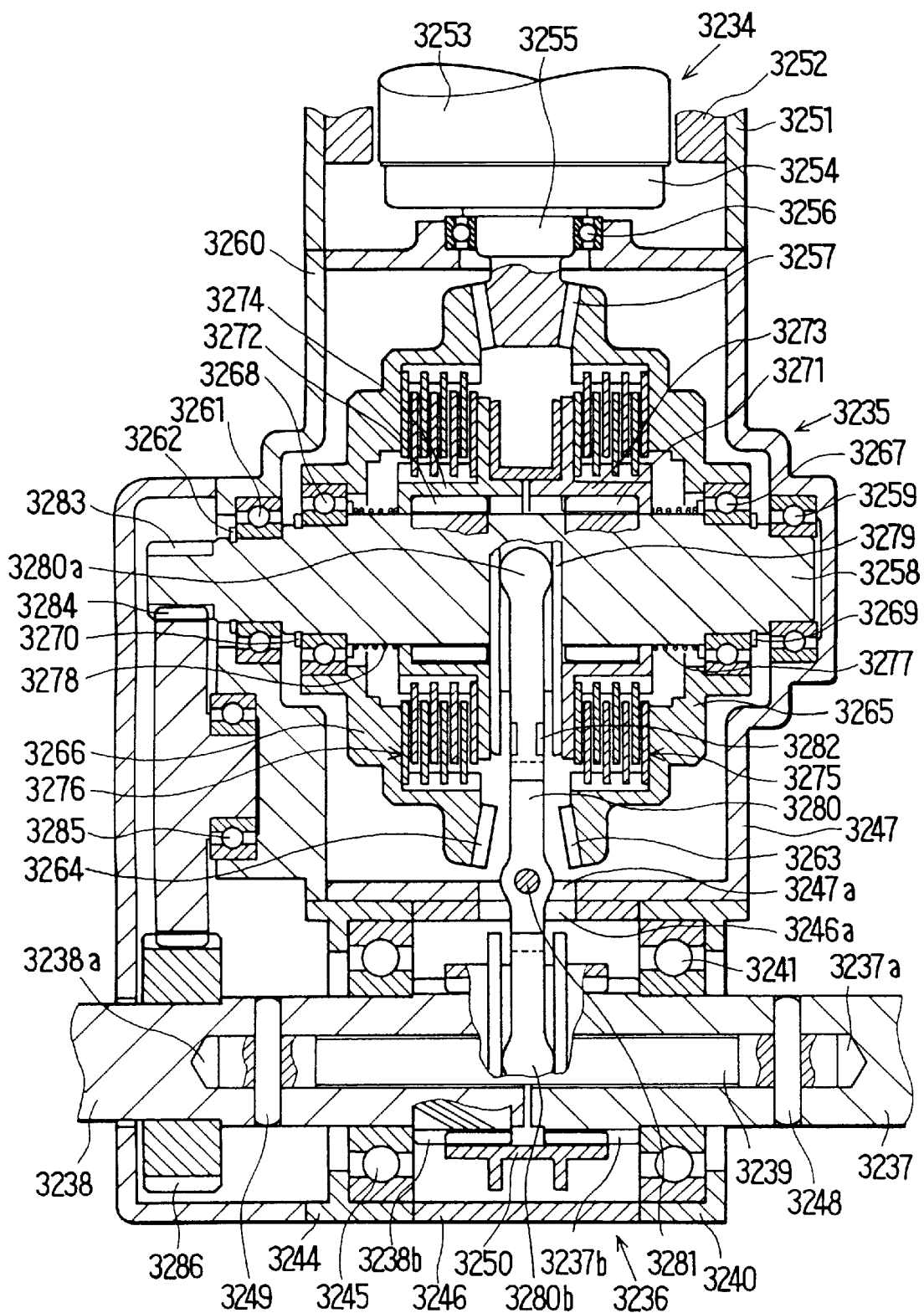
FIG. 26 is a sectional view of a switching unit used in the seventh embodiment.

In the seventh embodiment shown in FIGS. 25 and 26, a power steering device 3230 is constituted by a steering shaft 3233 for transmitting the steering force of a steering wheel 3231 to a vehicle wheel side rack shaft 3232, an electric motor 3234 of a power source of the steering assistance force applied to the rack shaft 3232, a switching unit 3235 for switching a unidirectional rotation output by the electric motor 3234 to the rotation in normal and reverse directions and transmitting it, a twisting sliding unit 3236 and the like.

The steering shaft 3233 is constituted by a stub shaft 3237 and a pinion shaft 3238 which are disposed opposite to each other on the same axis and a torsion bar 3239 for coupling the stub shaft 3237 to the pinion shaft 3238.

The stub shaft 3237 has one end thereof coupled to the steering wheel 3231 and the other end thereof rotatably supported by a bearing 3241 fixed to a slider cover 3240 (FIG. 26).

The pinion shaft 3238 is provided with a pinion gear 3242 on the other end, wherein the pinion gear 3242 is engaged with and coupled to a rack gear 3243 formed on the rack shaft 3232 (FIG. 25), and one end of the pinion shaft 3238 is rotatably supported by a bearing 3245 fixed to a slider cover 3244.

The slider cover 3240 and the slider cover 3244 are fitted in a slider case 3246 respectively and are fixed to the outer periphery of a clutch case 3247 such that the stub shaft 3237 and the pinion shaft 3238 are disposed on the same axis.

As shown in FIG. 26, the torsion bar 3239 is inserted into a hollow space 3237a formed in the other end side of the stub shaft 3237 and a hollow space 3238a formed in one end side of the pinion shaft 3238 and is prevented from rotating by pins 3248 and 3249 relative to the shafts 3237 and 3238.

On the outer peripheries of the opposite portions of the stub shaft 3237 and the pinion shaft 3238 is disposed a slider 3250 of the twisting sliding unit 3236. The slider 3250 is spread across and engaged with a straight spline 3237b formed on the outer peripheral portion of the other end side of the stub shaft 3237 and a helical spline 3238b formed on the outer peripheral portion of one end side of the pinion shaft 3238. Therefore, if the driver rotates the steering wheel 3231 to produce a torsion between the stub shaft 3237 and the pinion shaft 3238, the slider 3250 can be moved on the steering shaft 3233. More specifically, the helical spline 3238b of the pinion shaft 3238 shown in FIG. 26 is twisted clockwise when viewed from the stub shaft side and hence, if the stub shaft 3237 is twisted clockwise relative to the pinion shaft 3238, the slider 3250 is moved to the left side on the steering shaft 3233 and, if the stub shaft 3237 is twisted counterclockwise relative to the pinion shaft 3238, the slider 3250 is moved to the right side on the steering shaft 3233.

As shown in FIG. 26, the electric motor 3234 is a well-known direct current motor which is constituted by a cylindrical yoke 3251, a plurality of permanent magnets 3252 fixed on the inner peripheral surface of the yoke 3251, an armature disposed inside the inner peripheral sides of the permanent magnets 3252, a brush unit (not shown) for supplying electricity to the armature and the like.

The armature is provided with an armature core 3253 constituted by a plurality of laminated thin steel sheets, an armature coil 3254 wound on the armature core 3253, and an armature shaft 3255 for supporting the armature core 3253 and one end of the armature shaft 3255 is rotatably supported by a bearing 3256 fixed to the clutch case 3247 and the other end thereof is rotatably supported by a bearing (not shown). A driving bevel gear 3257 for transmitting rotation produced by the electric motor 3234 is formed on one end side of the armature shaft 3255 and a commutator (not shown) which is electrically mechanically coupled to the armature coil 3257 is disposed on the outer periphery of the other end side of the armature shaft 3255.

In this respect, the electric motor 3234 is rotated in one direction. It is assumed that the armature shaft 3255 is rotated counterclockwise when viewed from the bottom side in FIG. 26.

Next, the switching unit 3235 for switching the rotational direction of the electric motor 3234 according to the rotational direction of the stub shaft 3237 will be described.

The output shaft 3258 of the switching unit 3235 intersects the armature shaft 3255 of the electric motor 3234 at a right angle and is rotatably supported by a bearing 3259 fixed to the clutch case 3247 and a bearing 3261 fixed to a clutch cover 3260 fitted in the clutch case 3247 and the thrust thereof in the axial direction is regulated by a washer 3262.

A first rotating member 3265 having a driven bevel gear 3263 and a second rotating member 3266 having a driven bevel gear 3264 which are engaged with a driving bevel gear 3257 respectively are disposed opposite to each other on the output shaft 3258. The first rotating member 3265 and the second rotating member 3266 are rotatably supported by bearings 3267 and 3268 which are disposed on the output shaft 3258 respectively and the thrust thereof in the axial direction is regulated by washers 3269 and 3270. In this respect, the first rotating member 3265 and the second rotating member 3266 are disposed such that, if the armature is rotated counterclockwise, the first rotating member 3265 is rotated clockwise and the second rotating member 3266 is rotated counterclockwise when viewed from the left side in FIG. 26.

Helical splines 3271 and 3272 are formed on the outer peripheral portion of the output shaft 3258 and the first movable member 3273 and the second movable member 3274 are disposed such that those are engaged with the helical splines 3271 and 3272, respectively. The first movable member 3273 and the second movable member 3274 are disposed on the opposite portions of the first rotating member 3265 and the second rotating member 3266 and can be moved on the output shaft 3258 along the helical splines 3271 and 3272.

A group of plates for constituting a first clutch 3275 are disposed on the opposite portions of the first rotating member 3265 and the first movable member 3273 and a group of plates for constituting a second clutch 3276 is disposed on the opposite portions of the second rotating body 3266 and the second movable body 3276. The first clutch 3275 and the second clutch 3276 are constituted in a manner similar to the fifth embodiment.

The first movable member 3273 is pressed to the left side by a spring 3277 disposed between itself and a bearing 3267 for supporting the first rotating member 3265 via a washer and is prevented from moving to the left side in the axial direction by the end face of the helical spline 3271. Similarly, the second movable member 3274 is pressed to the right side by a spring 3278 disposed between itself and a bearing 3268 for supporting the second rotating member 3266 via a washer and is prevented from moving to the right side in the axial direction by the end face of the helical spline 3272. Thus, the group of plates for constituting the first clutch 3275 and the group of plates for constituting the second clutch 3276 are released to release the clutch 3275 and 3276.

A third movable member 3279 is disposed between the first movable member 3273 and the second movable member 3274. Further, the third movable member 3279 is coupled to the slider 3250 by a lever 3280 which is passed through an elongated hole 3247a made in the clutch case 3247 and an elongated hole 3246a made in the clutch case 3246.

The lever 3280 is provided with retaining portions 3280a and 3280b which are shaped like recessed portions when viewed from the axial direction (right and left directions) in FIG. 26 on both ends thereof, respectively and one retaining portion 3280a is retained by the recessed portion of the third movable member 3279 and the other retaining portion 3280b is retained by the recessed portion of the slider 3250 and is oscillatably supported by a supporting pin 3281 fixed to the clutch case 3247. A plurality of strain gages 3282 for detecting strain generated in the lever 3280 are disposed at the root of the retaining portion 3280b of the lever 3280.

A spur wheel 3283 is formed on one end of the output shaft 3258 and an idle gear 3284 engaged with the spur wheel 3283 is rotatably supported by a bearing 3285 fixed to the clutch cover 3260. Further, the idle gear 3284 is engaged with a spur wheel 3286 disposed on the pinion shaft 3238. Thus, torque generated by the electric motor 3234 is transmitted to the output shaft 3258 via the switching unit 3235 and the rotation of the output shaft 3258 is transmitted to the spur wheel 3283, the idle gear 3284, and the spur wheel 3286 and to the pinion shaft 3238 provided with the spur wheel 3286.

Next, the operation of switching the rotational direction of the electric motor 3234 according to the rotational direction of the stub shaft 237 will be described with reference to FIG. 26. As an example, a case in which the driver rotates the steering wheel 3231 in the direction that rotates the stub shaft 3237 clockwise when viewed from the left side in FIG. 26 will be described.

In this case, the slider 3250 on the steering shaft 3233 is moved to the left side on the steering shaft 3233. As the slider 3250 is moved to the left, the lever 3280 moved with the supporting pin 3281 as a fulcrum presses the first movable member 3273 to the right side via the third movable member 3279 while it compresses the spring 3277. The movement of the first movable member 3273 to the right side puts the group of plates for constituting the first clutch 3275 into contact with each other to slightly engage the first clutch 3275, whereas the strain generated in the lever 3280 is detected by the strain gages 3282 and an electric current is passed through the electric motor 3234 by a command from the ECU based on the signal of an amplifier (not shown) for outputting a voltage proportional to the amount of the strain, whereby the armature starts to rotate counterclockwise.

If the counterclockwise rotation of the armature is transmitted to the driven bevel gears 3263 and 3264 via the driving bevel gear 3257, the first rotating member 3265 having the driven bevel gear 3263 starts to be rotated clockwise and the rotating member 3266 having the driven bevel gear 3264 starts to be rotated counterclockwise when viewed from the left side in FIG. 26.

Since the first rotating member 3265 is coupled to the first movable member 3273 via the first clutch 3275, the clockwise rotation output is transmitted by the first rotating member 3265 to the first movable member 3273. Since the first movable member 3273 is helical spline-coupled to the output shaft 3258, if the clockwise rotation output is transmitted to the first movable member 3273 by the first rotating member 3265, the first movable member 3273 starts to be moved further to the right side in FIG. 26. The further movement of the first movable member 3273 continues to press the group of plates for constituting the first clutch 3275 until the reaction force of the rack shaft 3232 balances with the torque of the first rotating body 3265. If the reaction force of the rack shaft 3232 balances with the torque of the first rotating member 3265, the clockwise rotation output is transmitted to the output shaft 3258 and the clockwise steering assistance force is applied to the pinion shaft 3238 by the output shaft 3258 via the idle gear 3284.

Then, if the driver stops the steering operation to release the steering force, the electric current supplied to the electric motor 3234 is shut off by the signal based on the release of the steering force from an amplifier to stop the output of the electric motor 3234.

If the output of the electric motor 3234 is stopped, the torque of the first rotating member 3265 is eliminated and hence the pressing force for moving the first movable member 3273 to the right side in FIG. 26 via the helical spline 3271 is eliminated. Further, since the slider 3250 is returned to an original position (position shown in FIG. 26) by the release of the steering force, the group of plates for constituting the first clutch 3275 are released to separate the first rotating member 3265 from the first movable member 3273.

In this respect, if the driver rotates the steering wheel 3231 in the direction that rotates the stub shaft 3237 to the left side when viewed from the left side in FIG. 26, the slider 3250 is moved to the right side on the steering shaft 3233 to engage the second clutch 3276 via the lever 3280, whereby the second rotating member 3266 is coupled to the second movable member 3274 via the second clutch 3276. Thus, the counterclockwise rotation output is transmitted to the output shaft 3258 and the counterclockwise steering assistance force is applied to the pinion shaft 3238 by the output shaft 3258 via the idle gear 3284. This operation is the same as the above described case in which the stub shaft 3237 is rotated clockwise.

According to the seventh embodiment, in addition to the advantages of the fourth embodiment, an electromagnetic unit is not required as a moving mechanism for moving the first movable member 3273 and the second movable member 3274 so as to slightly engage the first clutch 3275 and the second clutch 3276, respectively. Further, since the output shaft 3258 provided with the first clutch 3275 and the second clutch 3276 is not a hollow shaft, the strength of the output shaft 3258 can be easily ensured. As a result, a lightweight compact inexpensive power steering device can be provided.

(Eighth Embodiment)

Figure 27:
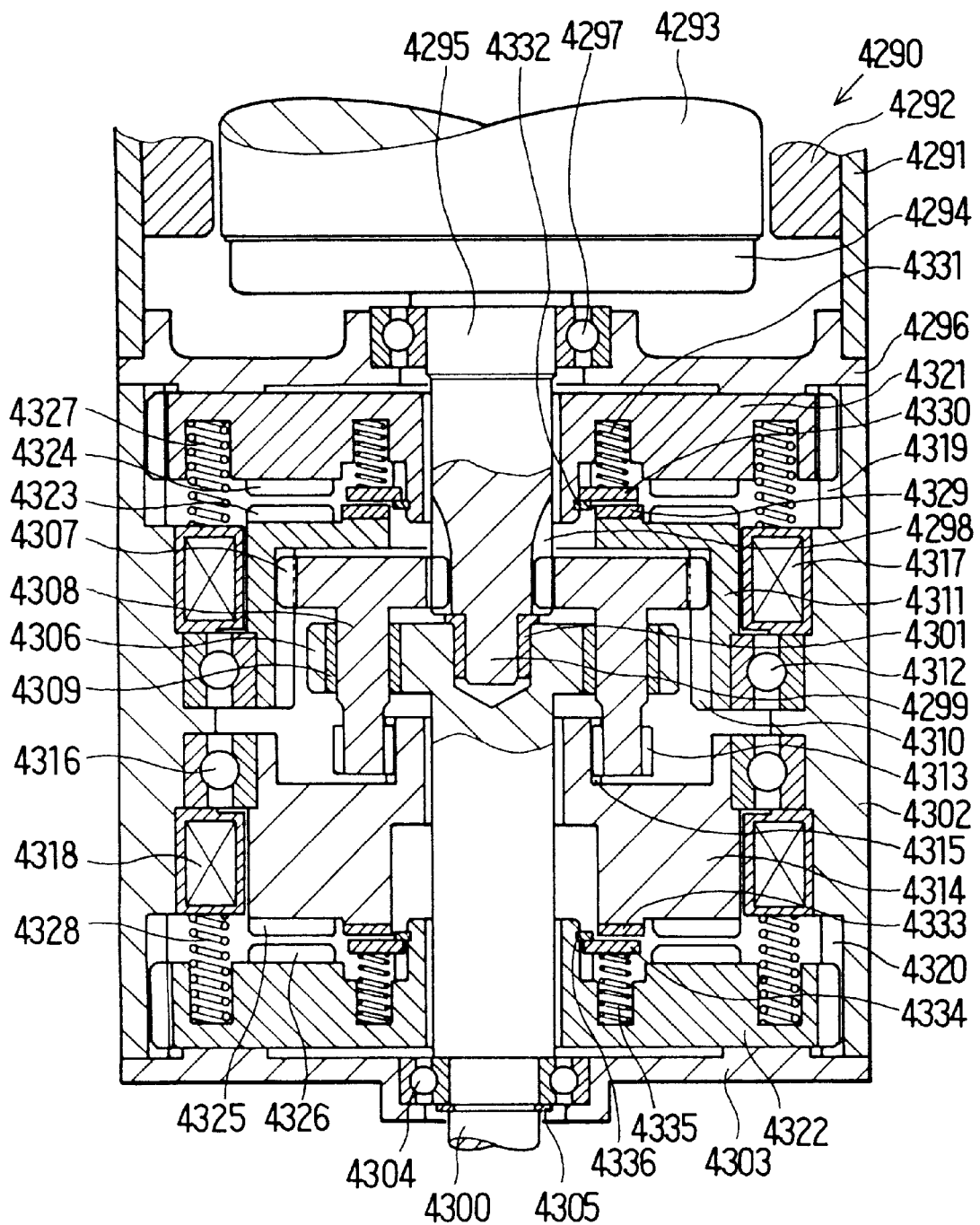
FIG. 27 is a sectional view of a switching unit used in an eighth embodiment of the present invention.

The eighth embodiment shown in FIG. 27 is a modification of the fifth embodiment shown in FIGS. 18 to 21.

In this eighth embodiment, as shown in FIG. 27, an electric motor 4290 is a well-known direct current motor which is constituted by a cylindrical yoke 4291, a plurality of permanent magnets 4292 fixed on the inner peripheral surface of the yoke 4291, an armature disposed inside the inner peripheral sides of the permanent magnets 4292, a brush unit (not shown) for supplying electricity to the armature, and the like.

The armature is provided with an armature core 4293 constituted by a plurality of laminated thin steel sheets, an armature coil 4294 wound on the armature core 4293, an armature shaft 4295 for supporting the armature core 4293, wherein one end side of the armature shaft 4295 is rotatably supported by a bearing 4297 fixed to a clutch case 4296 and the other end side thereof is rotatably supported by a bearing (not shown).

A driving sun gear 4298 for transmitting rotation produced by the electric motor 4290 is formed on one end side of the armature shaft 4295 and a portion with a small diameter 4299 is provided on the tip side from the driving sun gear 4298 (bottom side in FIG. 27) of the armature shaft 4295. Further, a commutator (not shown) which is electrically mechanically coupled to the armature coil 4294 is disposed on the outer periphery of the other end side of the armature shaft 4295.

In this respect, the electric motor 4290 is rotated in one direction. It is assumed that the armature shaft 4295 is rotated clockwise when viewed from the bottom side in FIG. 27.

Next, the structure of a switching unit for switching the rotational direction of the electric motor 4290 according to the rotational direction of the stub shaft will be described.

The output shaft 4300 for transmitting the rotation of the electric motor 4290 to a rack shaft is disposed on the same axis as the armature shaft 4295 of the electric motor 4290 and is rotatably supported by the portion 4299 with a small diameter of the armature shaft 4295 via a bearing 4301 disposed in the cylindrical recessed portion formed in the other end side of the output shaft 4300 and is rotatably supported by a bearing 4304 fixed to a clutch cover 4303 fitted in a clutch case 4302 and the thrust thereof in the axial direction is regulated by a washer 4305.

The clutch case 4302 is fitted in a center case 4296 on the same axis and is disposed such that the armature shaft 4295 and the output shaft 4300 are disposed on the same axis.

A flange portion 4306 is integrally formed on the outer periphery of the other end portion of the output shaft 4300 and a supporting pin 4308 having a first planetary gear 4307 engaged with the driving sun gear 4298 is rotatably supported by the flange portion 4306 via a bearing 4309. In this respect, the plurality of supporting pins 4308 and the plurality of first planetary gears 4307 are disposed at equal intervals in the circumferential direction of the flange portion 4306.

A first rotating member 4311 having an internal gear 4310 engaged with the internal teeth of the first planetary gear 4307 is rotatably supported by a bearing 4312 pressed into the clutch case 4302 on the same axis as the output shaft 4300. Further, a second planetary gear 4313 is formed on the end portion of the supporting pin 4308 (end portion opposite to the first planetary gear 4307) and the second planetary gear 4313 is engaged with the external teeth of the second sun gear 4315 formed on the second rotating member 4314. The second rotating member 4314 is rotatably supported on the same axis as the output shaft 4300 by a bearing 4316 disposed on the outer periphery of the output shaft 4300 pressed into the clutch case 4302.

A first coil 4317 and a second coil 4318 each of which is pressed into and fixed to the inner peripheral portion of the clutch case 4302 and constitutes an electromagnetic solenoid are disposed on the outer peripheries of the first rotating member 4311 and the second rotating member 4314. These coils 4317 and 4318 are electrically coupled to a power supply device through a lead wire (not shown).

A first helical spline 4319 and a second helical spline 4320 are formed on the inner peripheral surface of both ends of the clutch case 4302. A first movable member 4321 which is engaged with the first helical spline 4319 and can be moved in the axial direction of the output shaft 4300 along the first helical spline 4319 and a second movable member 4322 which is engaged with the second helical spline 4320 and can be moved in the axial direction of the output shaft 4300 along the second helical spline 4320 are disposed such that those sandwich the first rotating member 4311 and the second rotating member 4314.

On the opposite portions of the first rotating member 4311 and the first movable member 4321 are disposed claws 4323 and 4324 for constituting a first clutch and on the opposite portions of the second rotating member 4314 and the second movable member 4322 are disposed claws 4325 and 4326 for constituting a second clutch.

The first movable member 4321 is pressed on the first coil 4317 upward in FIG. 27 by a spring 4327 and is prevented from being moved upward by the end face of the center case 4296. Similarly, the second movable member 4322 is pressed on the second coil 4318 downward in FIG. 27 by a spring 4328 and is prevented from being moved downward by the end face of the clutch cover 4303. Thus, the claws 4323 and 4324 for constituting the first clutch and the claws 4325 and 4326 for constituting the second clutch are released to release the first clutch and the second clutch.

Further, on the opposite portions of the first rotating member 4311 and the first movable member 4321 which are inside the claws 4323 and 4324 of the first clutch in the radial direction are disposed a pair of friction plates 4329 and 4330 for constituting a third clutch. The friction plate 4330 provided on the first movable member 4321 is prevented from being rotated by a key groove made in the first movable member 4321 and is pressed down in FIG. 27 by a spring 4331 and is prevented from being moved down by a washer 4332 such that a gap between the friction plates 4329 and 4330 is smaller than a gap between the claws 4323 and 4324 for constituting the first clutch.

Similarly, on the opposite portions of the second rotating member 4314 and the second movable member 4322 which are inside the claws 4325 and 4326 in the radial direction are disposed a pair of friction plates 4333 and 4334 for constituting a fourth clutch. The friction plate 4334 provided on the second movable member 4322 is prevented from being rotated by a key groove made in the second movable member 4322 and is pressed down in FIG. 27 by a spring 4335 and is prevented from being moved down by a washer 4336 such that a gap between the friction plates 4333 and 4334 is smaller than a gap between the claws 4325 and 4326 for constituting the second clutch.

Next, the operation of switching the rotational direction of the electric motor 4290 according to the rotational direction of the stub shaft will be described.

For example, if an electric current is passed through the first coil 4317 by a voltage signal of a torque sensor (FIG. 19) based on a torsional direction between the stub shaft and the pinion shaft when the driver operates the steering wheel, a magnetic force generated in the first coil 4317 attracts the first movable member 4321 while it compresses the spring 4327 and spring 4331 to put both friction plates 4329 and 4330 for constituting the third clutch into contact with each other, whereby the third clutch is slightly engaged. The claws 4323 and 4324 for constituting the first clutch are not engaged.

In this respect, if the electric motor 4290 is driven, the driving sun gear 4298 is rotated clockwise and hence the first rotating member 4311 having the internal gear 4310 starts to be rotated counterclockwise via the first planetary gear 4307. Thus, the first rotating member 4311 transmits a rotational force to the first movable member 4321 via the third clutch. The first movable member 4321 is moved further to first rotating member 4311 along the first helical spline 4319 of the clutch case 4302 by the rotational force transmitted by the first rotating member 4311 while it compresses the spring 4327 and the spring 4331 to press both friction plates 4329 and 4330 until the reaction of the rack shaft balances with the torque of the output shaft 4300.

If the reaction of the rack shaft balances with the torque of the output shaft 4300, the first rotating member 4311 having the internal gear 4310 is completely engaged with the clutch case 4302 and is prevented from being rotated and hence the clockwise rotation of the driving sun gear 4298 is transmitted to the output shaft 4300 while it rotates the output shaft 4300 clockwise with reduced rotational speed.

If the reaction of the rack shaft does not balance with the torque of the output shaft 4300, the first movable member 4321 is further moved to engage the claws 4323 and 4324 for constituting the first clutch with each other while it makes both friction plates 4329 and 4330 for constituting the third clutch gradually regulate the rotation of the first rotating member 4311 which is being rotated counterclockwise to apply brakes on the first rotating member 4311. Since the first rotating member 4311 having the internal gear 4310 is completely engaged with the clutch case 4302 and is prevented from being rotated by the engagement of the claws 4323 and 4324, the clockwise rotation of the driving sun gear 4298 is transmitted to the output shaft 4300 while it rotates the output shaft 4300 clockwise with reduced rotational speed.

If there is no torsion, an electric current supplied to the first coil 4317 is shut by the voltage signal of the torque sensor and the first movable body 4321 is moved to the original position (position shown in FIG. 27) by the force of the spring 4327 and the spring 4331 to release each clutch.

On the other hand, if an electric current is passed through the second coil 4318, the second movable member 4314 which starts to be rotated clockwise is prevented from being rotated as is the above case and the clockwise rotation of the driving sun gear 4298 is transmitted to the output shaft 4300 while it rotates the output shaft 4300 counterclockwise with reduced rotational speed, whereby the rotational direction of the electric motor 4290 can be switched according to the rotational direction of the stub shaft 4104.

According to the eighth embodiment, the similar advantage as in the fifth embodiment can be provided. Further, since an electromagnet unit is not housed in the rotating member, a brush unit for supplying electricity to the electromagnet which is used in the fifth embodiment is not required. In contrast to the other embodiments, the friction clutches are used in this embodiment when the reaction force of the rack shaft is small and hence the claw clutches are surely engaged when the reaction force is large to transmit the output of the electric motor 4290. This is advantageous that the claw clutches are smoothly engaged so that vibration, noises, wear of claws, broken claws or the like are not caused by the connection or disconnection of the clutch mechanism when the rotational direction of the steering wheel is suddenly switched in the right and left directions and that the engaging clutches can surely transmit the rotation when high power is output so as to ensure the durability of the friction clutches, and hence can provide an electrically driven power steering device whose clutches are smoothly engaged and disengaged and hence are durable.

Although the pinion shaft and the rack shaft, and the output shaft and the rack shaft are coupled by a rack and pinion type in the above embodiments, it is needless to say that the other system such as a ball and screw type, a worm and roller type and a worm and pin type can be also used.

The present invention should not be limited to the above embodiments but may be modified in various ways without departing from the scope and the spirit of the invention.

We claim:

1. An electrically driven power steering device comprising:

a steering shaft having a stub shaft coupled to a steering wheel, a pinion shaft coupled to a vehicle wheel, and a torsion bar for coupling the stub shaft to the pinion shaft on the same axis;

an electric motor for generating a unidirectional rotational force in an armature shaft disposed on a different axis relative to the steering shaft;

a transmitting member for transmitting rotation of the electric motor;

a planetary gear speed reduction mechanism disposed on the same axis as the steering shaft for reducing the rotation of the electric motor transmitted via the transmitting member and transmitting the reduced speed to the pinion shaft; and a switching mechanism for switching a rotational direction of the rotational force transmitted to the pinion shaft by the planetary gear speed reduction mechanism according to the rotational direction of the stub shaft.

2. The device according to claim 1, wherein the planetary gear speed reduction mechanism includes:

a first sun gear rotatably disposed on the same axis as the steering shaft for receiving the rotation of the electric motor via the transmitting member;

a first planetary gear engaged with the first sun gear to revolve around the sun gear;

an internal gear engaged with internal teeth of the first planetary gear;

a second planetary gear rotatable integrally with the first planetary gear on the same axis; and a second sun gear rotatably supported on the same axis as the steering shaft and engaged with external teeth of the second planetary gear, wherein the switching mechanism has a clutch mechanism which regulates one of the rotation of the internal gear and that of the second sun gear to enable the rotation of the other gear according to the rotational direction of the stub shaft.

3. The device according to claim 2, wherein the transmitting member includes:

an armature gear formed on the armature shaft; and a third sun gear disposed on the same axis as the first sun gear and engaged with the armature gear to rotate integrally with the first sun gear.

4. The device according to claim 2, wherein the transmitting member includes:

an armature gear formed on the armature shaft;

a third sun gear disposed on the same axis as the first sun gear to rotate integrally with the first sun gear; and an idle gear interposed between the armature gear and the third sun gear.

5. The device according to claim 2, wherein:

the planetary gear speed reduction mechanism is constructed to satisfy $Z1=3\cdot(m2/m1)\cdot Z2$, with m1 being a module and Z1 being the number of teeth of the first planetary gear, and with m2 being a module and Z2 being the number of teeth of the second planetary gear.

6. The device according to claim 1, further comprising:

an elastic member disposed in a path for transmitting a rotational force of the electric motor to the pinion shaft whiling dampening a driving impact generated when the gears are engaged with each other.

7. An electrically driven device comprising:

a steering shaft having an input-side shaft, an output-side shaft and a torsion bar for coupling the input-side shaft to the output-side shaft on the same axis;

an electric motor having an armature shaft which are disposed on a different axis from that of the steering shaft and rotatable in a unidirectional rotational force;

a transmitting member for transmitting rotation of the armature shaft;

a planetary gear mechanism disposed on the same axis as the steering shaft for reducing the rotation of the armature shaft transmitted via the transmitting member and transmitting the reduced speed to the output-side shaft; and a switching mechanism for switching a rotational direction of the rotational force transmitted to the output-side shaft by the planetary gear mechanism according to the rotational direction of the input-side shaft.

8. The device according to claim 7, wherein the planetary gear mechanism includes:

a first sun gear rotatably disposed on the same axis as the steering shaft for receiving the rotation of the electric motor via the transmitting member;

a first planetary gear engaged with the first sun gear to revolve around the first sun gear;

an internal gear engaged with internal teeth of the first planetary gear;

a second planetary gear rotatable integrally with the first planetary gear on the same axis; and a second sun gear rotatably supported on the same axis as the steering shaft and engaged with external teeth of the second planetary gear, wherein the switching mechanism has a clutch mechanism which regulates one of the rotation of the internal gear and that of the second sun gear to enable the rotation of the other gear according to the rotational direction of the stub shaft.

9. The device according to claim 8, wherein the transmitting member includes:

an armature gear formed on the armature shaft; and a third sun gear disposed on the same axis as the first sun gear and engaged with the armature gear to rotate integrally with the first sun gear.

10. The device according to claim 9, further comprising:

an elastic member disposed between the first sun gear and the third sun gear for transmitting the rotational force of the armature shaft to the output-side shaft while dampening a driving impact caused by engagement between gears.

11. An electrically driven power steering device comprising:

a stub shaft coupled to a steering wheel;

a rack shaft coupled to a vehicle wheel;

a pinion shaft coupled to the rack shaft;

a torsion bar for coupling the stub shaft to the pinion shaft;

an electric motor for providing a steering assistance force to be applied to the rack shaft;

a switching unit for switching a unidirectional rotation output by the electric motor to the rotation in normal and reverse directions according to the rotational direction of the stub shaft to transmit the rotation; and an output shaft for transmitting rotation transmitted via the switching unit to the rack shaft, wherein the switching unit includes:

a first rotating member and a second rotating member which are rotatably provided on the output shaft in opposite directions to each other and to which the rotation of the electric motor is transmitted;

selecting means for selecting one of the first rotating member and the second rotating member according to the rotational direction of the stub shaft;

a clutch mechanism for coupling the one rotating member selected by the selecting means to the output shaft; and changing means for generating a load in the direction of thrust of the output shaft by the output of the electric motor and for changing the thrust load to the engaging force of the clutch mechanism.

12. The device according to claim 11, wherein:

the output shaft is integral with the pinion shaft.

13. The device according to claim 11, further comprising:

one-way clutch provided in a transmission path through which the unidirectional rotation of the electric motor is transmitted to the switching unit.

14. The device according to claim 11, wherein:

the changing means is helical spline-coupled to a cylindrical fixing member provided on the same axis as the output shaft and has a movable member movable axially on the output shaft along the helical spline, the movable member receiving the output of the electric motor and being movable in a direction that increases the engaging force of the clutch mechanism.

15. The device according to claim 14, wherein:

the clutch mechanism includes a first clutch interposed between the first rotating member and the movable member and a second clutch interposed between the second rotating member and the movable member, each of the first clutch and the second clutch being a friction clutch.

16. The device according to claim 14, wherein:

the clutch mechanism includes a first clutch interposed between the first rotating member and the movable member and a second clutch interposed between the second rotating member and the movable member, each of the first clutch and the second clutch being a complex clutch of a friction clutch and an engaging clutch.

17. The device according to claim 14, wherein:

the movable member is provided with an elastic member for disengaging the first clutch and the second clutch when the electric motor is not driving.

18. The device according to claim 14, wherein:

the selecting means includes moving means for moving the movable member in the axial direction according to a relative torsion angle between the stub shaft and the pinion shaft and switching means for controlling an electric current passed through the electric motor according to the relative torsion angle between the stub shaft and the pinion shaft.

19. The device according to claim 18, wherein:

the moving means is an electromagnet unit for moving the movable member by electromagnetic force based on a command of the switching means.

20. The device according to claim 18, wherein:

the moving means is provided with a sliding member which is engaged with a helical spline formed on one of a rotating shaft rotated in regard to the stub shaft and a rotating shaft rotated in regard to the pinion shaft and which can be moved on the other rotating shaft in the axial direction thereof, while it is prevented from being rotated thereby, and moves the movable member based on extent of movement of the movable member.

21. The device according to claim 18, wherein:

the switching means includes a torque sensor for electrically detecting a relative torsion angle between the stub shaft and the pinion shaft.

22. The device according to claim 18, wherein:

the switching means includes a torque sensor for mechanically amplifying a relative torsion angle between the stub shaft and the pinion shaft and electrically detecting the amplified relative torsion angle.

23. The device according to claim 20, wherein:

the switching means includes a torque sensor for electrically detecting an extent of axial movement of the sliding member.

24. The device according to claim 20, wherein:

the switching means includes a torque sensor for electrically detecting the amount of mechanical strain of the sliding member and the movable member generated in the moving means.

* * * * *